US007587264B2

(12) United States Patent
Furuno et al.

(10) Patent No.: US 7,587,264 B2
(45) Date of Patent: Sep. 8, 2009

(54) CONSTRUCTION MACHINE DIAGNOSIS INFORMATION PRESENTING DEVICE, DIAGNOSIS INFORMATION DISPLAY SYSTEM, AND DIAGNOSIS INFORMATION PRESENTING METHOD

(75) Inventors: Yoshinori Furuno, Tsuchiura (JP); Koji Fujita, Tsukuba (JP); Takanobu Ikari, Tsuchiura (JP); Shinji Akino, Ushiku (JP); Yoshinori Ohwada, Ibaraki-ken (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 529 days.

(21) Appl. No.: 10/549,814

(22) PCT Filed: Aug. 10, 2004

(86) PCT No.: PCT/JP2004/011474

§ 371 (c)(1),
(2), (4) Date: Sep. 19, 2005

(87) PCT Pub. No.: WO2005/024143

PCT Pub. Date: Mar. 17, 2005

(65) Prior Publication Data

US 2006/0200283 A1 Sep. 7, 2006

(30) Foreign Application Priority Data

Sep. 4, 2003 (JP) ............................ 2003-312357

(51) Int. Cl.
*G01M 17/00* (2006.01)

(52) U.S. Cl. ............................ 701/29; 701/34; 701/35; 701/50; 702/185

(58) Field of Classification Search ............ 701/29-36, 701/50, 100-102; 702/182, 188
See application file for complete search history.

(56) References Cited

U.S. PATENT DOCUMENTS

| | | | | |
|---|---|---|---|---|
| 6,349,252 | B1 | 2/2002 | Imanishi et al. | |
| 7,019,668 | B2 * | 3/2006 | Kinugawa | 340/870.16 |
| 7,076,348 | B2 * | 7/2006 | Bucher et al. | 701/35 |
| 7,406,399 | B2 * | 7/2008 | Furem et al. | 702/182 |
| 2002/0154003 | A1 | 10/2002 | Ueda | |

FOREIGN PATENT DOCUMENTS

| | | |
|---|---|---|
| JP | 2000-297443 | 10/2000 |
| JP | 2002-301953 | 10/2002 |

* cited by examiner

*Primary Examiner*—Richjard M. Camby
(74) *Attorney, Agent, or Firm*—Mattingly & Malur, PC

(57) ABSTRACT

A diagnostic information presenting apparatus comprises sensors 40, etc. for detecting status variables regarding operating status or ambient environments of a construction machine, and a controller 2 for outputting, to a display unit 50, a basic data display signal to display basic data necessary for an initial screen 100 in accordance with detected signals from the sensors 40, etc., and for outputting, to the display unit 50, an alarm display signal or a failure display signal to present alarm display or failure display in accordance with alarm information regarding the status variables detected by the sensors 40, etc. or failure information from the sensors 40, etc. This enables information regarding an abnormality in the construction machine to be presented to an operator with an alarm in the least necessary way without giving nuisances to the operator.

4 Claims, 16 Drawing Sheets

FIG. 12

| MENU ITEM | SENSOR OUTPUT/STATE | SENSOR TYPE | REMARKS |
|---|---|---|---|
| ENGINE (1) OUTPUT DROP | ENGINE REVOLUTION SPEED | ............ | |
| | THROTTLE POSITION | ............ | |
| | INTAKE MANIFOLD TEMPERATURE | ............ | |
| | INTERCOOLER INLET TEMPERATURE | ............ | |
| | TURBO-BOOSTED PRESSURE | ............ | |
| | ENGINE DERATED STATE | ............ | |
| | ON/OFF-STATE OF OPERATION | ............ | |
| | ETC. | ............ | |
| ENGINE (2) OUTPUT DROP | ENGINE REVOLUTION SPEED | ............ | |
| | THROTTLE POSITION | ............ | |
| | INTAKE MANIFOLD TEMPERATURE | ............ | |
| | INTERCOOLER INLET TEMPERATURE | ............ | |
| | TURBO-BOOSTED PRESSURE | ............ | |
| | ENGINE DERATED STATE | ............ | |
| | ON/OFF-STATE OF OPERATION | ............ | |
| | ETC. | ............ | |
| DROP OF WORKING OIL HEAT BALANCE | WORKING OIL TEMPERATURE | ............ | |
| | OIL COOLER INLET TEMPERATURE | ............ | |
| | OIL COOLER OUTLET TEMPERATURE | ............ | |
| | OIL COOLER OUTLET PRESSURE | ............ | |
| | ............ | ............ | |
| | ............ | ............ | |
| | ............ | ............ | |
| | ............ | ............ | |
| | ETC. | | |
| EXHAUST TEMPERATURE (PER CYLINDER) | No. 1 TO 20 CYLINDERS | ............ | DISPLAY MAX/MIN VALUES PER CYLINDER |
| FUEL CONSUMPTION (LOAD FACTOR) | ENGINE (1) REVOLUTION SPEED | ............ | |
| | ENGINE (2) REVOLUTION SPEED | ............ | |
| | ENGINE (1) FUEL CONSUMPTION | ............ | DISPLAY MAX/MIN VALUES |
| | ENGINE (2) FUEL CONSUMPTION | ............ | DISPLAY MAX/MIN VALUES |
| | ON/OFF-STATE OF OPERATION | ............ | |
| | | | |
| BOOM-RAISING SPEED | BOOM ANGLE | ............ | |
| | BOOM-RAISING OPERATION STATE | ............ | |
| | TIME | ............ | |
| SWING SPEED | SWING OPERATION STATE | ............ | |
| | TIME | ............ | |
| ............ | | ............ | |
| | | | |

FIG. 13

COOLING WATER
OVERHEAT ALARM

| PARAMETER | TARGET LOCATION/ FACTOR | USAGE/DETERMINATION ITEM |
|---|---|---|
| ATMOSPHERIC TEMPERATURE | BASIC PARAMETER | HEAT BALANCE CONFIRMATION PARAMETER |
| COOLING WATER TEMPERATURE AT UPPER MANIFOLD | RADIATOR | DISPLAY OF ENGINE DERATING CONTROL METER |
| AIR TEMPERATURE IN FRONT OF RADIATOR | RADIATOR | DETECTING OF CLOGGING, CRACKING, ETC. OF RADIATOR |
| RADIATOR OUTLET TEMPERATURE | RADIATOR | DIFFERANCE |
| INLET PRESSURE OF RADIATOR COOLER FAN MOTOR | FAN PUMP | PRESSURE DROPS IF PUMP EFFICIENCY LOWERS DUE TO FAN PUMP INTERNAL LEAK, ETC. |
| COOLING WATER PUMP DELIVERY PRESSURE/ UPPER MANIFOLD PRESSURE | COOLING WATER PUMP | PRESSURIZED LEVEL OF COOLING WATER IS DETECTED, AND IF NOT PRESSURIZED, THERE IS LEAKAGE |
| ENGINE REVOLUTION SPEED | FAN PUMP/ COOLING WATER PUMP | WHETHER ENGINE CONTROL IS NORMAL |

ABNORMAL COMBUSTION AND
INTAKE/EXHAUST ABNORMALITY ALARM

| PARAMETER | TARGET LOCATION/ FACTOR | USAGE/DETERMINATION ITEM |
|---|---|---|
| EXHAUST TEMPERATURE (PER CYLINDER) | ABNORMAL COMBUSTION WITHIN CYLINDER | DETECT VARIATION WIDTH OF EXHAUST TEMPERATURE DURING ENGINE REVOLUTION |
| ENGINE REVOLUTION SPEED | REVOLUTION SENSOR | ACTUAL REVOLUTION SPEED FOR USE IN ENGINE CONTROL |
| BOOSTED PRESSURE | | MONITOR INFLUENCE OF BOOSTED PRESSURE |
| INTAKE MANIFOLD INLET TEMPERATURE | INTAKE TEMPERATURE | MONITOR INFLUENCE OF INTAKE TEMPERATURE |
| ATMOSPHERIC PRESSURE | PRESSURE OF ATMOSPHERE | MONITOR INFLUENCE OF ATMOSPHERIC PRESSURE CHANGE |
| ENGINE LOAD FACTOR | ENGINE LOAD | SITUATION OF LOAD ACTING ENGINE |
| ............ | ............ | ............ |

CONSTRUCTION MACHINE DIAGNOSIS INFORMATION PRESENTING DEVICE, DIAGNOSIS INFORMATION DISPLAY SYSTEM, AND DIAGNOSIS INFORMATION PRESENTING METHOD

TECHNICAL FIELD

The present invention relates to a diagnostic information presenting apparatus and a diagnostic information display system for a construction machine. More particularly, the present invention relates to a diagnostic information presenting apparatus, a diagnostic information display system, and a diagnostic information presenting method for a construction machine, such as a large-sized hydraulic excavator.

BACKGROUND ART

A construction machine, particularly a large-sized hydraulic excavator or the like, is used, e.g., for excavation of each and rocks in a large work site. In general, such a hydraulic excavator is continuously operated for the purpose of increasing productivity. If there occurs an abnormality, it is required to stop the operation of the hydraulic excavator and repair it. Depending on the severity of the abnormality, the operation must be stopped for a long period. In that case, because production work with the hydraulic excavator is suspended, scheduling of a production plan must be changed.

To diagnose soundness of the hydraulic excavator with the view of avoiding that problem, it is required to detect information regarding the internal state, the abnormal state, etc. of the hydraulic excavator. In recent situations, the number of kinds of data to be detected has been increased with increasing complexity in structure of the hydraulic excavator (see, e.g., Patent Reference 1).

Patent Reference 1: JP,A 2002-301953

DISCLOSURE OF THE INVENTION

In a continuously operated construction machine, particularly a hydraulic excavator or the like, as described above, it is required to reduce the downtime by taking in detection data as many as possible, diagnosing soundness of the construction machine, and presenting the location, cause and sings of an abnormality to an operator in advance. On the other hand, because a large-sized construction machine is continuously operated as described above, the operator is urged to make a judgment during the operation as to whether the hydraulic excavator is to continue or stop the operation unless the occurrence of an abnormality and factors of abnormal signs are clarified and presented to the operator. That situation increases operator's fatigue in physical and psychological points of view. It is therefore important to effectively present data regarding the occurrence of an abnormality without giving psychological burdens and nuisances to the operator.

The present invention has been made in view of the above-stated situations in the art, and its object is to provide a diagnostic information presenting apparatus, a diagnostic information display system, and a diagnostic information presenting method for a construction machine, which can present abnormality information of the construction machine to an operator with an alarm in the least necessary way without giving nuisances to the operator.

Another object of the present invention is to provide a diagnostic information presenting apparatus, a diagnostic information display system, and a diagnostic information presenting method for a construction machine, which can reduce operator's fatigue or mechanic's fatigue.

Still another object of the present invention is to provide a diagnostic information presenting apparatus, a diagnostic information display system, and a diagnostic information presenting method for a construction machine, which can precisely present the location and details of an abnormality occurred in the construction machine, thereby minimizing the downtime of the construction machine.

Still another object of the present invention is to provide a diagnostic information presenting apparatus, a diagnostic information display system, and a diagnostic information presenting method for a construction machine, which can reduce the downtime of the construction machine and can increase productivity.

To achieve the above objects, a diagnostic information presenting apparatus according to a first invention comprises detection means for detecting status variables regarding operating status or ambient environments of a construction machine; and control means for outputting, to display means, a basic data display signal to display basic data necessary for a usual screen in accordance with detected signals from the detection means, and for outputting, to the display means, an alarm display signal or a failure display signal to present alarm display or failure display in accordance with alarm information regarding the status variables detected by the detection means or failure information from the detection means.

With the first invention, the detection means detects the status variables regarding the operating status or the ambient environments, and the control means outputs, to the display means, the basic data display signal necessary for the usual screen in accordance with the detected signals, thereby displaying the basic data. On the other hand, the control means outputs the alarm display signal to the display means in accordance with the alarm information regarding the status variables detected by the detection means, thereby presenting the alarm display on the display means, and also outputs the failure display signal to the display means in accordance with the failure information from the detection means, thereby presenting the failure display on the display means.

Thus, during the machine operation by the operator, only the least necessary basic data is displayed on the display means and the alarm/failure display is presented, whereas the other data is not displayed on the usual screen. It is therefore possible to effectively present abnormal information of the construction machine in the least necessary way while providing the display in a manner to avoid the operator from feeling psychological burdens and nuisances beyond an allowable level.

According to a second invention, in the above first invention, the apparatus further comprises first storage means for storing combinations of snapshot menu items and the status variables made correspondent to the items per item in advance, and the control means outputs, to the display means, a menu display signal to display a list of a plurality of manual snapshot items stored in the first storage means in accordance with a selection command from an operator, and acquires or extracts, in accordance with a selection command from the operator to select one of the displayed list items, those of the status variable data, which are within a predetermined time and made correspondent to the selected item based on the combinations, from among the corresponding detected signals from the detection means, thereby storing those data in the first storage means.

With the second invention, when the operator performs an appropriate selection operation, for example, upon looking at the alarm display or the failure display, the list of manual snapshot items is displayed on the display means by the menu display signal outputted from the control means in accordance with the selection command. For each of the manual snapshot items, the corresponding status variables are made related as a set of combinations in advance. When the operator appropriately selects one of the manual snapshot items upon looking at the list, those of the status variable data, which are within the predetermined time and made correspondent to the selected item, are acquired or extracted by the control means and are stored in the first storage means. Then, when the control means outputs a reproduction display signal, for example, in response to an appropriate operation by the operator, the display means is able to display the stored status variable data within the predetermined period.

Thus, from the alarm/failure display presented in the least necessary way on the usual screen, the operator is able to confirm details of the alarm/failure, as required, for assistance to failure diagnosis. Therefore, operator's physical and psychological burdens can be prevented from increasing with the display information presented in an intricate and frequent manner beyond a necessary level as experienced in the related art, and fatigue of the operator can be greatly reduced. Further, when the operator confirms the details of the alarm/failure, just by selecting one of the snapshot items, only the status variables regarding the selected item and being within the predetermined time are automatically acquired, reproduced and displayed. Therefore, the occurrence location of an abnormality in the construction machine and details of the abnormality can be accurately presented without wasteful information. As a result, it is possible to minimize the downtime of the construction machine in the event of an abnormality, and to increase productivity.

According to a third invention, in the above first aspect, the apparatus further comprises second storage means for storing combinations of the alarm information or the failure information and the status variables made correspondent to the alarm information or the failure information in advance, and when the alarm information or the failure information is inputted, the control means acquires or extracts those of the status variable data, which are within a predetermined time and made correspondent to the inputted information based on the combinations, from among the corresponding detected signals from the detection means, thereby storing those data in the second storage means.

With the third invention, for example, when the alarm display is presented in accordance with the alarm information or when the failure display is presented in accordance with the failure information, those of the status variable data, which are within the predetermined time and made correspondent to the alarm information or the failure information, are automatically acquired or extracted by the control means and are stored in the second storage means. Then, when the control means outputs a reproduction display signal, for example, in response to an appropriate operation by the operator, the display means is able to display the stored status variable data within the predetermined period.

Thus, from the alarm/failure display presented in the least necessary way on the usual screen, the operator is able to confirm details of the alarm/failure, as required, for assistance to failure diagnosis. Therefore, operator's physical and psychological burdens can be prevented from increasing with the display information presented in an intricate and frequent manner beyond a necessary level as experienced in the related art, and fatigue of the operator can be greatly reduced. Further, when confirming the details of the alarm/failure, since the status variables regarding the alarm/failure and being within the predetermined time are automatically acquired, reproduced and displayed without requiring the operator to perform any special operation, the occurrence location of an abnormality in the construction machine and details of the abnormality can be accurately presented without wasteful information. As a result, it is possible to minimize the downtime of the construction machine in the event of an abnormality, and to increase productivity.

According to a fourth invention, in the above second or third invention, the control means outputs, to the display means, a reproduction display signal to reproduce and display changes of the status variable data which are stored in the first or second storage means and are within the predetermined time.

According to a fifth invention, in the above first invention, the apparatus further comprises third storage means for storing maintenance history information inputted in the past, and the control means outputs, to the display means, a maintenance history display signal to display a list of maintenance history stored in the third storage means in accordance with a selection command from an operator.

As mentioned above, a construction machine used for excavation of earth and rocks in a large work site or the like, such as a large-sized hydraulic excavator, is continuously operated and only operators take turns in operating the machine per predetermined time. In the event of any alarm or failure, for example, the operator having relieved the predecessor often wants to know what kinds of maintenance have been made during work performed by the preceding operator.

With the fifth invention, to meet such a demand, when the operator performs an appropriate selection operation upon looking the alarm display or the failure display, for example, the maintenance history list is displayed on the display means by the maintenance history display signal outputted from the control means in accordance with the selection command. Thus, from the alarm/failure display presented in the least necessary way on the usual screen, the operator is able to confirm maintenance situations, as required, for assistance to failure diagnosis.

To achieve the above objects, a diagnostic information presenting system according to a sixth invention comprises detection means for detecting status variables regarding operating status or ambient environments of a construction machine; display means disposed in a cab of the construction machine; and control means for outputting, to the display means, a basic data display signal to display basic data necessary for a usual screen in accordance with detected signals from the detection means, and for outputting, to the display means, an alarm display signal or a failure display signal to present alarm display or failure display in accordance with alarm information regarding the status variables detected by the detection means or failure information from the detection means.

According to a seventh invention, in the above sixth invention, the system further comprises first storage means for storing combinations of snapshot menu items and the status variables made correspondent to the items per item in advance, and the control means outputs, to the display means, a menu display signal to display a list of a plurality of manual snapshot items stored in the first storage means in accordance with a selection command from an operator, and acquires or extracts, in accordance with a selection command from the operator to select one of the displayed list items, those of the status variable data, which are within a predetermined time and made correspondent to the selected item based on the combinations, from among the corresponding detected signals from the detection means, thereby storing those data in the first storage means.

According to an eighth invention, in the above sixth invention, the system further comprises second storage means for storing combinations of the alarm information or the failure information and the status variables made correspondent to the alarm information or the failure information in advance, and when the alarm information or the failure information is inputted, the control means acquires or extracts those of the status variable data, which are within a predetermined time and made correspondent to the inputted information based on the combinations, from among the corresponding detected signals from the detection means, thereby storing those data in the second storage means.

According to a ninth invention, in the above seventh or eighth invention, the control means outputs, to the display means, a reproduction display signal to reproduce and display changes of the status variable data which are stored in the first or second storage means and are within the predetermined time.

According to a tenth invention, in the above sixth invention, the system further comprises third storage means for storing maintenance history information inputted in the past, and the control means outputs, to the display means, a maintenance history display signal to display a list of maintenance history stored in the third storage means in accordance with a selection command from an operator.

To achieve the above objects, a diagnostic information presenting method according to an eleventh invention comprises the steps of outputting, to display means, a basic data display signal to display basic data necessary for a usual screen in accordance with detected signals of status variables outputted from detection means and regarding operating status or ambient environments of a construction machine; and outputting, to the display means, an alarm display signal or a failure display signal to present alarm display or failure display in accordance with alarm information regarding the status variables detected by the detection means or failure information from the detection means.

According to a twelfth invention, in the above eleventh invention, the method further comprises the steps of outputting, to the display means, a menu display signal to display a list of a plurality of manual snapshot items, which are stored as a set of combinations made correspondent to the status variables per item in the first storage means, in accordance with a selection command from an operator; and acquiring or extracting, in accordance with a selection command from the operator to select one of the displayed list items, those of the status variable data, which are within a predetermined time and made correspondent to the selected item, from among the corresponding detected signals from the detection means, thereby storing those data in the first storage means.

According to a thirteenth invention, in the above eleventh invention, the method further comprises the step of, when the alarm information or the failure information is inputted, acquiring or extracting those of the status variable data, which are within a predetermined time, made correspondent to the inputted information, and are stored as the set of combinations in a second storage means, from among the corresponding detected signals from the detection means, thereby storing those data in the second storage means.

According to a fourteenth invention, in the above twelfth or thirteenth invention, the method further comprises the step of outputting, to the display means, a reproduction display signal to reproduce and display changes of the status variable data which are stored in the first or second storage means and are within the predetermined time.

According to a fifteenth invention, in the above eleventh invention, the method further comprises the step of outputting, to the display means, a maintenance history display signal to display a list of maintenance history, which has been inputted in the past and stored in the third storage means, in accordance with a selection command from an operator.

BRIEF DESCRIPTION OF THE DRAWINGS

FIG. 12 is a table showing one example of combinations of manual snapshot items and a plurality of corresponding status variables per item.

FIG. 13 is a table showing one example of combinations of alarm/failure items and a plurality of corresponding status variables per item in an automatic snapshot mode.

REFERENCE NUMERALS

2 controller (control means)
40 sensor (detection means)
50 display unit (display means)
100 initial screen (usual screen)

BEST MODE FOR CARRYING OUT THE INVENTION

One embodiment of the present invention will be described below with reference to the drawings.

One embodiment of a diagnostic information presenting apparatus for a construction machine according to the present invention will be described below with reference to the drawings.

Figure 1:
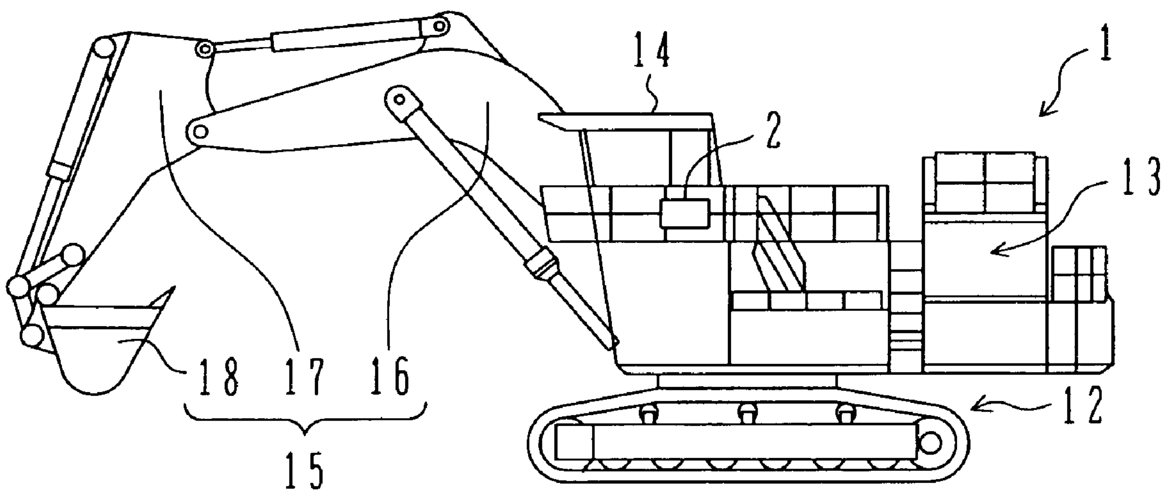
FIG. 1 is a side view showing of the structure of a construction machine to which one embodiment of a diagnostic information presenting apparatus for a construction machine according to the present invention is applied.

FIG. 1 is a side view showing of the structure of a construction machine (hydraulic excavator in the illustrated example) to which one embodiment of the diagnostic information presenting apparatus for the construction machine according to the present invention is applied.

A hydraulic excavator 1 comprises a travel body 12, a swing body 13 mounted on the travel body 12 in a swingable manner, a cab 14 provided in a front left portion of the swing body 13, and a front operating mechanism (excavating device) 15 mounted to a front central portion of the swing body 13 in a vertically angularly movable manner. The front operating mechanism 15 is made up of a boom 16 rotatably mounted to the swing body 13, an arm 17 rotatably mounted to a fore end of the boom 16, and a bucket 18 rotatably mounted to a fore end of the arm 17. Further, a (machine side) controller 2 is installed in the cab 14.

While the hydraulic excavator 1 is shown in FIG. 1, by way of example, as the so-called super-large-sized excavator (backhoe type) of a class having the body weight of several hundreds tons, which is employed in, e.g., mines or quarry sites in many cases, applications of the present invention are not limited to that class of excavators. In other words, the present invention is also applicable to the so-called large- or medium-sized excavator of a class having the body weight of several tens tons (such as shown in FIGS. 2 and 3 described later), which is most popularly employed in various construction work sites or quarry sites, etc., and to the so-called mini-excavator of an even smaller class which is employed in small-scaled work sites.

Figure 2:
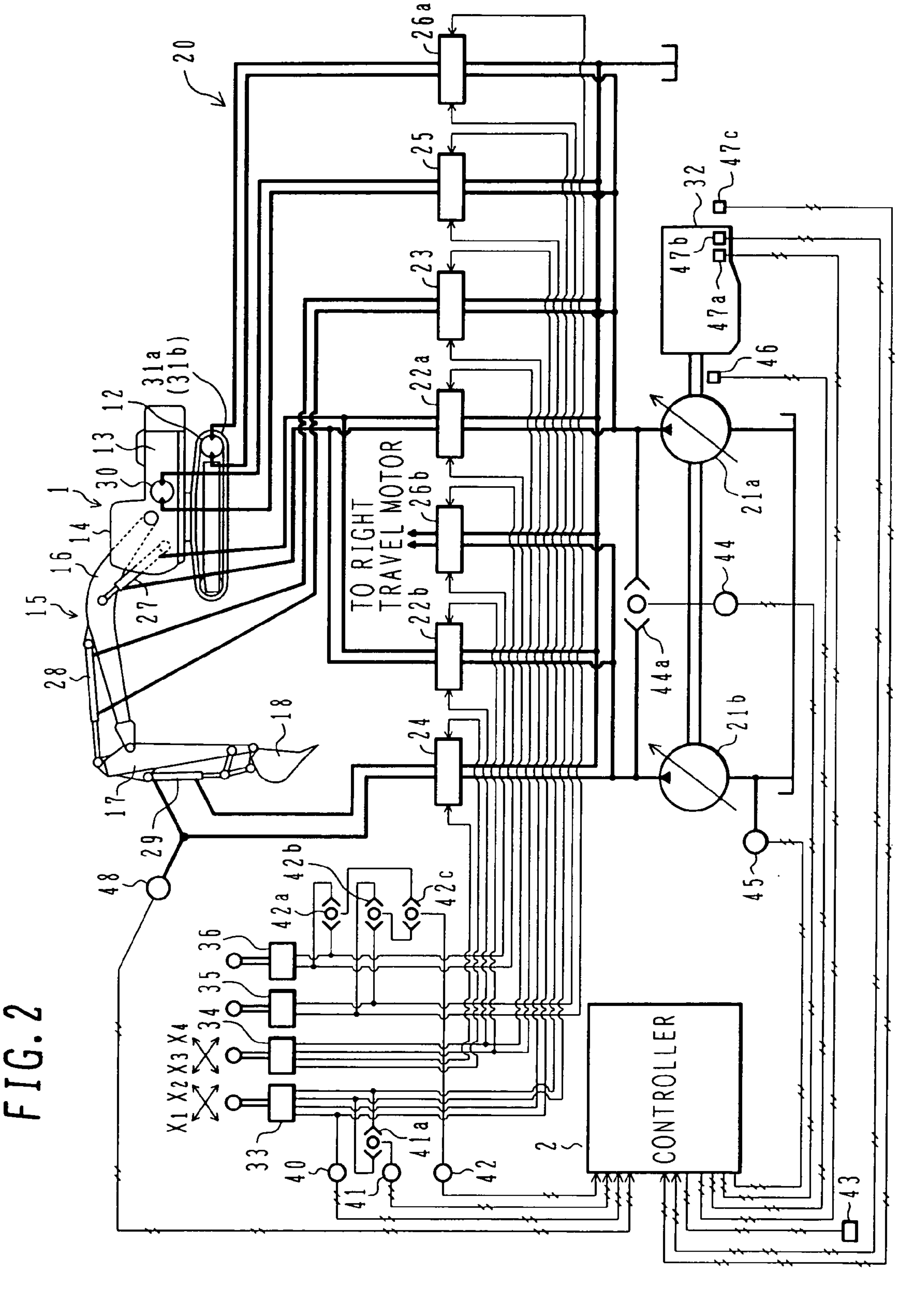
FIG. 2 is a diagram schematically showing one example of a hydraulic system, along with sensors, installed in a hydraulic excavator, shown in FIG. 1, to which one embodiment of the diagnostic information presenting apparatus for the construction machine according to the present invention is applied.
Figure 3:
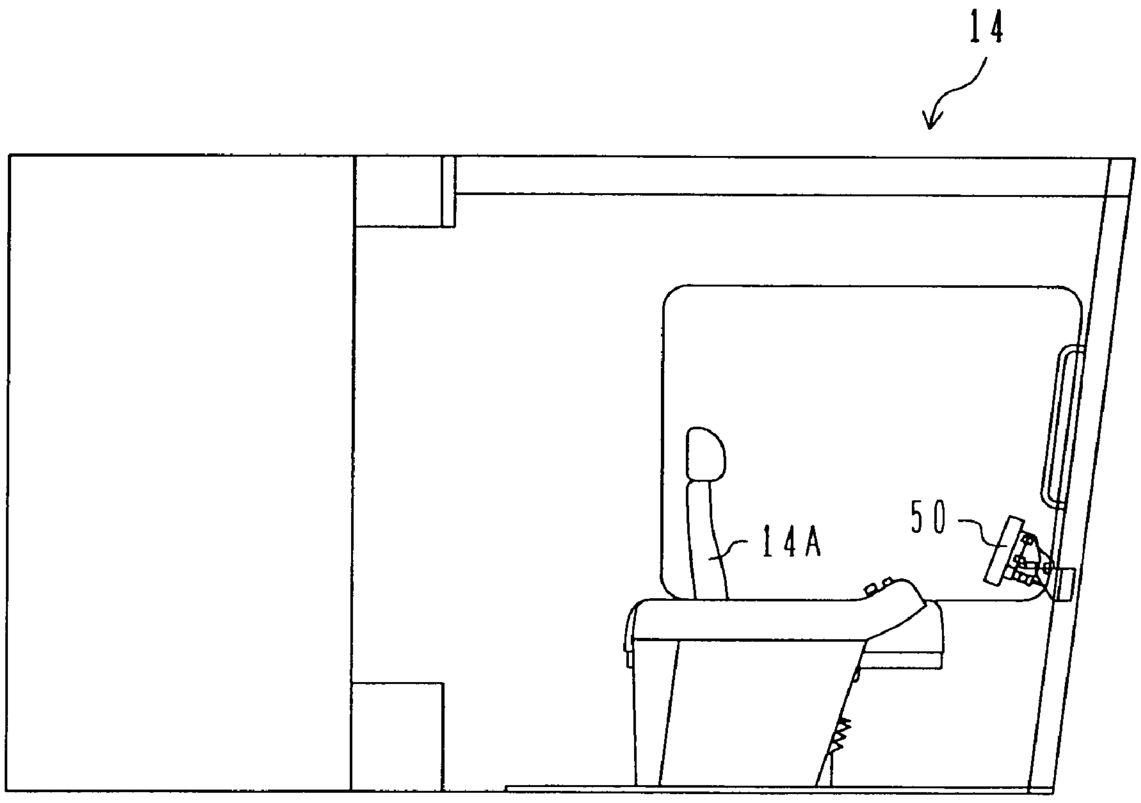
FIG. 3 is a side view showing an internal arrangement of a cab installed on the hydraulic excavator, shown in FIG. 1, to which one embodiment of the diagnostic information presenting apparatus for the construction machine according to the present invention is applied.

FIG. 2 is a diagram schematically showing one example of a hydraulic system, along with sensors, installed in a hydraulic excavator, shown in FIG. 1, to which one embodiment of the diagnostic information presenting apparatus for the construction machine according to the present invention is applied.

In FIG. 2, a hydraulic system 20 installed in the hydraulic excavator 1 comprises, for example, hydraulic pumps 21*a*, 21*b*, boom control valves 22*a*, 22*b*, an arm control valve 23, a bucket control valve 24, a swing control valve 25, travel control valves 26*a*, 26*b*, a boom cylinder 27, an arm cylinder 28, a bucket cylinder 29, a swing motor 30, and travel motors 31*a*, 31*b*.

The hydraulic pumps 21*a*, 21*b* are driven for rotation by two diesel engines 32 (only one is shown; hereinafter also referred to simply as an "engine 32") each provided with a fuel injecting device (not shown) of the so-called electronic governor type, and deliver a hydraulic fluid. The control valves (regulation valves) 22*a*, 22*b*-26*a*, 26*b* control respective flows (flow rates and flowing directions) of the hydraulic fluid supplied from the hydraulic pumps 21*a*, 21*b* to the hydraulic actuators 27-31*a*, 31*b*, and the hydraulic actuators 27-31*a*, 31*b* drive the boom 16, the arm 17, the bucket 18, the swing body 13, and the travel body 12. The hydraulic pumps 21*a*, 21*b*, the control valves 22*a*, 22*b*-26*a*, 26*b*, and the engine 32 are mounted in an accommodation room (engine room) in a rear portion of the swing body 13.

Control lever devices 33, 34, 35 and 36 are disposed corresponding to the control valves 22*a*, 22*b*-26*a*, 26*b*. When a control lever of the control lever device 33 is manipulated in one X1 of two crossed directions, an arm-crowding pilot pressure or an arm-dumping pilot pressure is produced and applied to the arm control valve 23. When the control lever of the control lever device 33 is manipulated in the other X2 of the two crossed directions, a rightward-swing pilot pressure or a leftward-swing pilot pressure is produced and applied to the swing control valve 25.

When a control lever of the control lever device 34 is manipulated in one X3 of two crossed directions, a boom-raising pilot pressure or a boom-lowering pilot pressure is produced and applied to the boom control valves 22*a*, 22*b*. When the control lever of the control lever device 34 is manipulated in the other X4 of the two crossed directions, a bucket-crowding pilot pressure or a bucket-dumping pilot pressure is produced and applied to the bucket control valve 24. Further, when control levers of the control lever devices 35, 36 are manipulated, a left-travel pilot pressure and a right-travel pilot pressure are produced and applied to the travel control valves 26*a*, 26*b*. The control lever devices 33 to 36 are disposed in the cab 14 along with the controller 2.

Sensors 40-46, 47*a*, 47*b* and 47*c* are disposed in the hydraulic system 20 described above. The sensor 40 is a pressure sensor for detecting, as an operation signal of the front operating mechanism 15, the boom-raising pilot pressure in this embodiment, and the sensor 41 is a pressure sensor for detecting, as a swing operation signal, the swing pilot pressure taken out through a shuttle valve 41*a*. The sensor 42 is a pressure sensor for detecting, as a travel operation signal, the travel pilot pressure taken out through shuttle valves 42*a*, 42*b* and 42*c*.

The sensor 43 is a sensor for detecting an ON/OFF state of a key switch for the engine 32, the sensor 44 is a pressure sensor for detecting the delivery pressure of the hydraulic pumps 21*a*, 21*b*, i.e., the pump pressure, taken out through a shuttle valve 44*a*, and the sensor 45 is an oil temperature sensor for detecting the temperature of working oil (i.e., the oil temperature) in the hydraulic system 20. The sensor 46 is a engine speed sensor for detecting the revolution speed of the engine 32. The sensor 47*a* is a fuel sensor for detecting the amount of fuel injected by the fuel injecting device of the engine 32 (i.e., the fuel consumption), the sensor 47*b* is a pressure sensor for detecting the turbo-boosted pressure in the engine 32, and the sensor 47*c* is a temperature sensor for detecting the temperature of a coolant (radiator water) for cooling the engine 32 (e.g., the temperature at an upper manifold and the temperature at an outlet). Though not shown for the sake of simplicity of the drawing, other various sensors are also disposed which include, for example, a sensor for detecting the exhaust temperature per cylinder, a sensor for detecting the throttle position of an electronic governor, a sensor for detecting the fuel level, a sensor for detecting the battery voltage, a sensor for detecting the temperature of an intake manifold, a sensor for detecting the pressure in the upper manifold of a radiator, a sensor for detecting the air temperature in front of the radiator, a sensor for detecting the pressure (hydraulic pressure) at an inlet of a hydraulic motor for a radiator cooling fan, a sensor for detecting the delivery pressure of a cooling water pump, a sensor for detecting the temperature of an intercooler, and sensors for detecting the inlet and outlet temperatures and the outlet pressure of an oil cooler with regard to the engine 32. Other examples include a sensor for detecting a boom angle with respect to the boom 16, and a sensor for detecting the atmospheric pressure, a sensor for detecting the atmospheric temperature with regard to ambient environments. Detected signals from those sensors 40-46, 47*a*, 47*b* and 47*c* (hereinafter also referred to simply as the "sensors 40, etc.") are all sent to and collected in the controller 2.

While the above description is made, by way of example, in connection with the control levers of the hydraulic pilot type, the present invention is not limited to that type and can be applied to the so-called electric lever as well. In such a case, an electric signal (command signal) from each control lever device using the electric lever is itself used as a detected signal instead of detecting the pilot pressure to determine the operating status.

The controller 2 collects status variables regarding the operating status of the hydraulic excavator 1 and status variables regarding the ambient environments, which are detected by the sensors 40, etc., and provides various kinds of display in the cab 14 corresponding to the detected results. The greatest feature of the present invention resides in the forms of display presented in the cab 14.

Figure 4:
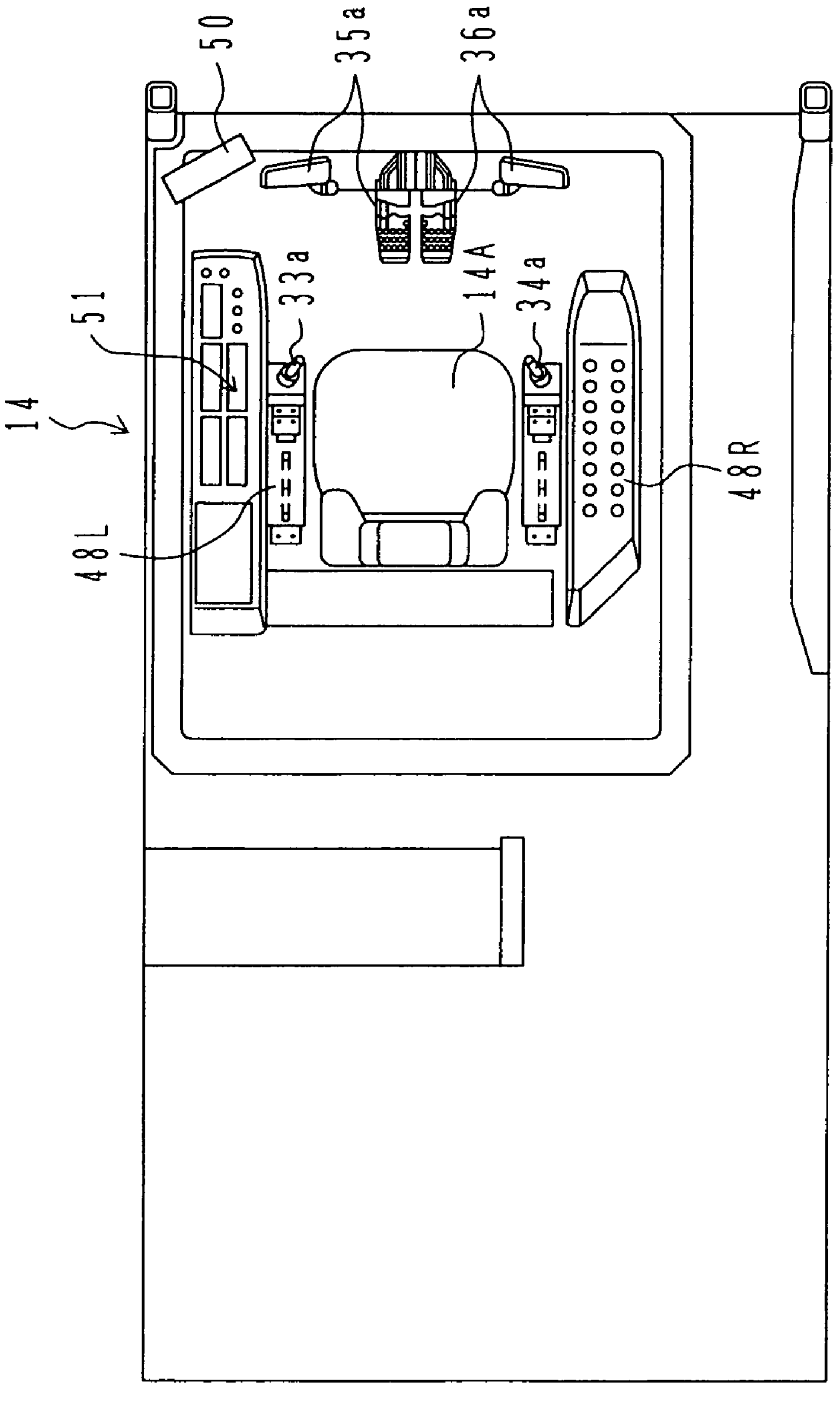
FIG. 4 is a plan view showing the internal arrangement of the cab installed on the hydraulic excavator, shown in FIG. 1, to which one embodiment of the diagnostic information presenting apparatus for the construction machine according to the present invention is applied.

FIGS. 3 and 4 are respectively a side view and a plan view showing an internal arrangement of the cab installed on the hydraulic excavator, shown in FIG. 1, to which one embodiment of the diagnostic information presenting apparatus for the construction machine according to the present invention is applied.

In FIGS. 3 and 4, left- and right-side travel control levers 35*a*, 36*a* of the travel control lever devices 35, 36, which can be operated by the operator's hand or foot, are disposed in front of a seat 14A in the cab 14 on which the operator is seated. Also, left- and right-side manual control levers 33*a*, 34*a* of the control lever devices 33, 34, which can be each manipulated in two crossed directions, are disposed on the left and right sides of the seat 14A, respectively. A left-side console 48L is disposed on the left side of the seat 14A, and a right-side console 48R is disposed on the right side of the seat 14A.

In the cab 14, a display unit 50 and a keypad 51 are further disposed to serve as display means and operating means, respectively, which constitute primary components of the diagnostic information presenting apparatus for the construction machine according to the present invention. The display unit 50 is disposed on a front wall of the cab 14 at a left front position looking from the operator sitting on the seat and at a level slightly higher than the control lever 33*a* in the vertical direction. The keypad 51 is disposed leftward of the control lever 33*a* and the left-side console 48L on the left side of the seat 14A.

Figure 5:
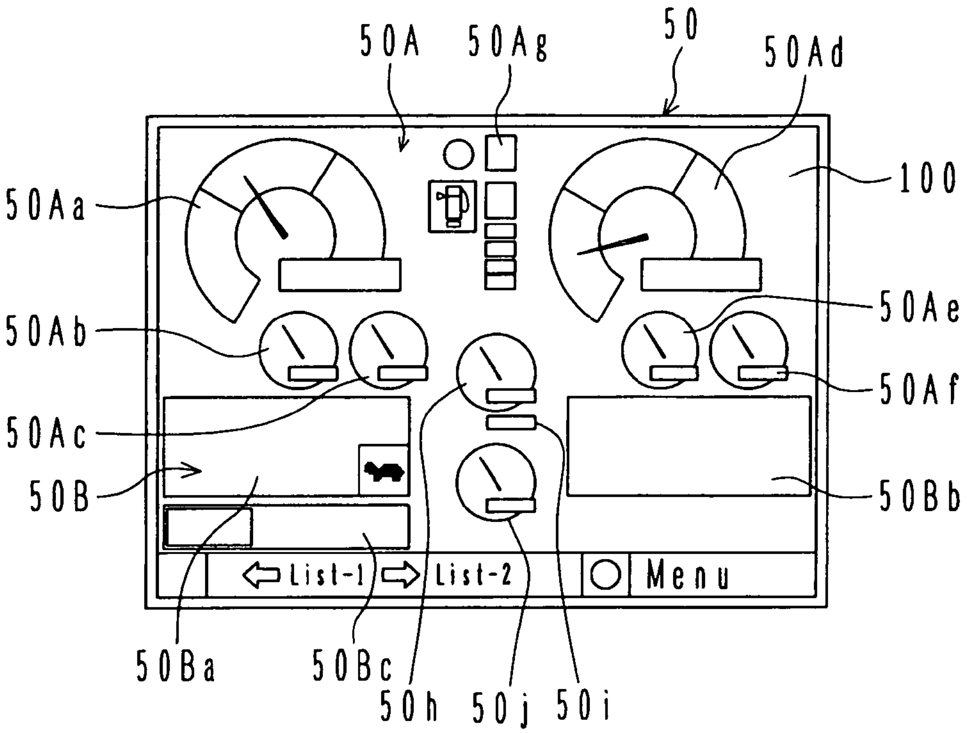
FIG. 5 is a front view showing the displayed state of a usual screen (=initial screen) after power-on of a display unit, which constitutes one embodiment of the diagnostic information presenting apparatus for the construction machine according to the present invention.

FIG. 5 is a front view showing the displayed state of a usual screen (=initial screen) after power-on of the display unit 50, which constitutes one embodiment of the diagnostic information presenting apparatus for the construction machine according to the present invention.

In the displayed state of an initial screen 100 after the power-on, as shown in FIG. 5, the display unit 50 has a basic data display area 50A for displaying basic data that is least necessary in the normal operation, and an alarm/failure display area 50B.

The basic data display area 50A has a tachometer display area 50Aa, a radiator cooling-water temperature display area 50Ab, a turbo-boosted pressure display area 50Ac for one of the two engines 32, and a tachometer display area 50Ad, a radiator cooling-water temperature display area 50Ae, a turbo-boosted pressure display area 50Af for the other engine 32. It also has a fuel level display area 50Ag, a working oil temperature display area 50Ah, an atmospheric temperature display area 50Ai, and a battery voltage display area 50Aj.

The alarm/failure display area 50B has an alarm display area 50Ba for displaying alarms related to one of the two engines 32 and various indicators, an alarm display area 50Bb for displaying alarms related to the other engine 32 and the hydraulic system, and a failure display area 50Bc for displaying an abnormality (in the form of, e.g., a preset failure code) of the control unit/communication system including not only the sensors 40, etc., but also the controller 2 and so on.

Figure 6:
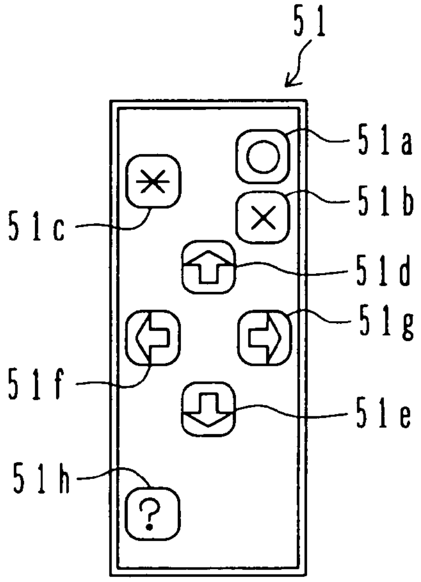
FIG. 6 is a front view showing a detailed arrangement of a keypad, which constitutes one embodiment of the diagnostic information presenting apparatus for the construction machine according to the present invention.

FIG. 6 is a front view showing a detailed arrangement of the keypad 51, which constitutes one embodiment of the diagnostic information presenting apparatus for the construction machine according to the present invention.

In FIG. 6, the keypad 51 includes, as various operating buttons, a "○" button 51*a*, a "×" button 51*b*, a "*" button 51*c*, an upward cursor "↑" button 51*d*, a downward cursor "↓" button 51*e*, a leftward cursor "←" button 51*f*, a rightward cursor "→" button 51*g*, and a "?" button 51*h*. With any button touched by the operator's hand, a corresponding operation signal X is outputted to the controller 2.

Returning to FIGS. 3 and 4, the controller 2 is installed at an appropriate position (e.g., below the seat 14A) inside the cab 14.

Figure 7:
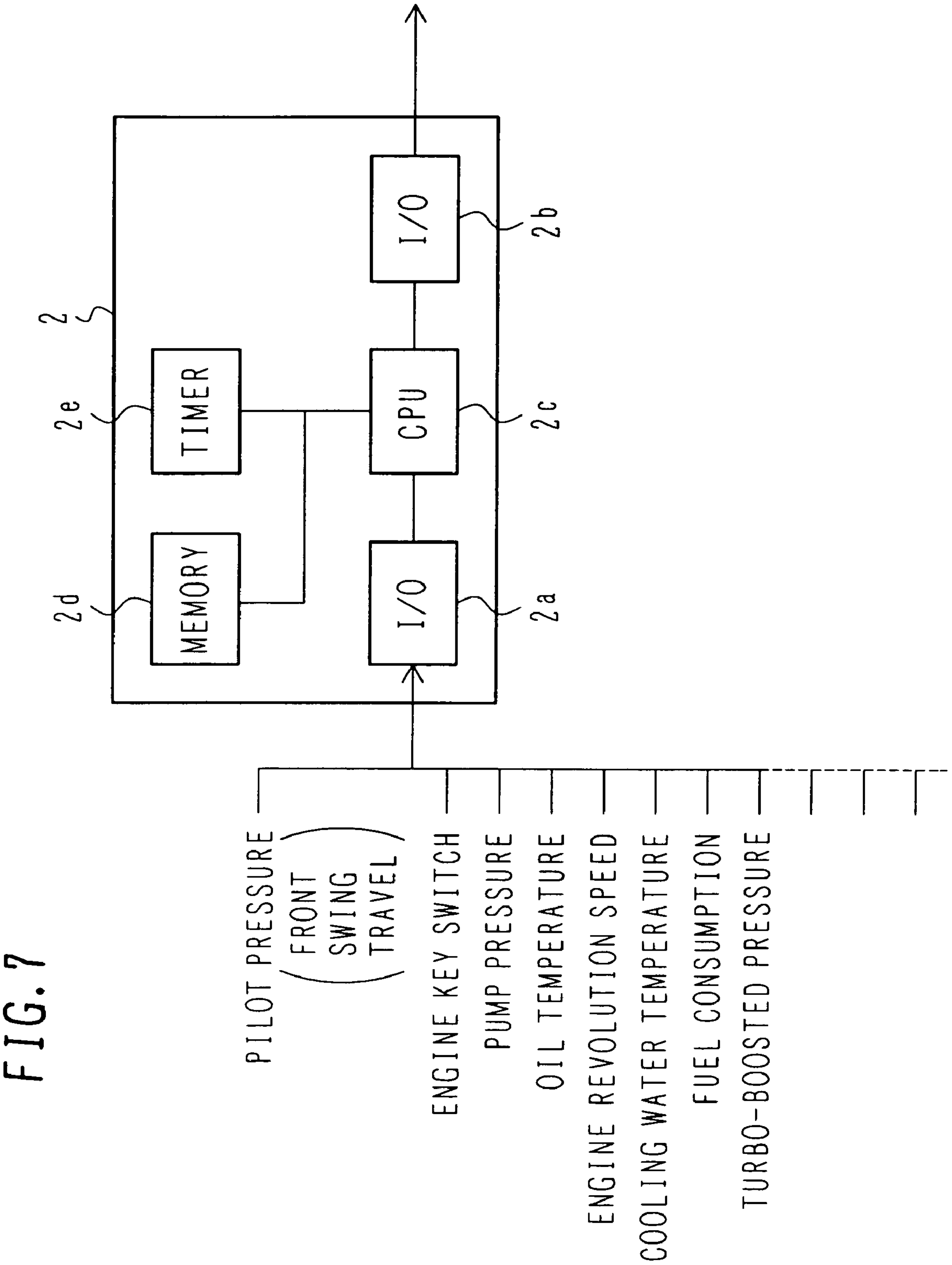
FIG. 7 is a block diagram showing a functional arrangement of a controller, which constitutes one embodiment of the diagnostic information presenting apparatus for the construction machine according to the present invention.

FIG. 7 is a block diagram showing a functional arrangement of the controller 2, which constitutes one embodiment of the diagnostic information presenting apparatus for the construction machine according to the present invention.

In FIG. 7, the controller 2 comprises input/output interfaces 2*a*, 2*b*, a CPU (Central Processing Unit) 2*c*, a memory 2*d*, and a timer 2*e*.

The input/output interface 2*a* receives, from the sensors 40, etc., detected signals of the respective pilot pressures for the front operating mechanism 15, the swing and the travel, and a detected signal of turning-on of the key switch for the engine 32, detected signals of the pump pressures of the pumps 21*a*, 21*b*, a detected signal of the oil temperature, a detected signal of the revolution speed of the engine 32, a detected signal of the cooling water temperature, a detected signal of the fuel consumption, a detected signal of the turbo-boosted pressure, a detected signal of the exhaust temperature of the engine 32, a detected signal of the throttle position, a detected signal of the intake manifold temperature, a detected signal of the pressure in the upper manifold of the radiator, a detected signal of the air temperature in front of the radiator, a detected signal of the pressure at the inlet of the hydraulic motor for the radiator cooling fan, a detected signal of the delivery pressure of the cooling water pump, a detected signal of the intercooler temperature, detected signals of the inlet and outlet temperatures and the outlet pressure of the oil cooler, a detected signal of the boom angle, a detected signal of the atmospheric pressure, a detected signal of the atmospheric temperature, etc. Additionally, for the engine 23, it is also possible to detect a derating control state (=state under known control of reducing the engine output upon overheat of the cooling water or a drop of the oil pressure) by detecting a derating control signal, and to receive a derating detection signal for use in the system control.

The CPU 2*c* executes predetermined arithmetic operations based on the received signals and stores the computed results in the memory 2*d*. In such processing, the timer (including the clock function) 2*e* is employed as required. Also, the timer 2*e* may be used to set intervals (cycles) at which the detected signals are taken in from the sensors 40, etc.

Though not shown, the controller 2 further comprises a ROM as a recording medium for storing control programs to execute the arithmetic operations in the CPU 2*c*, and a RAM as storage means for temporarily storing data during the arithmetic operations.

Figure 8:
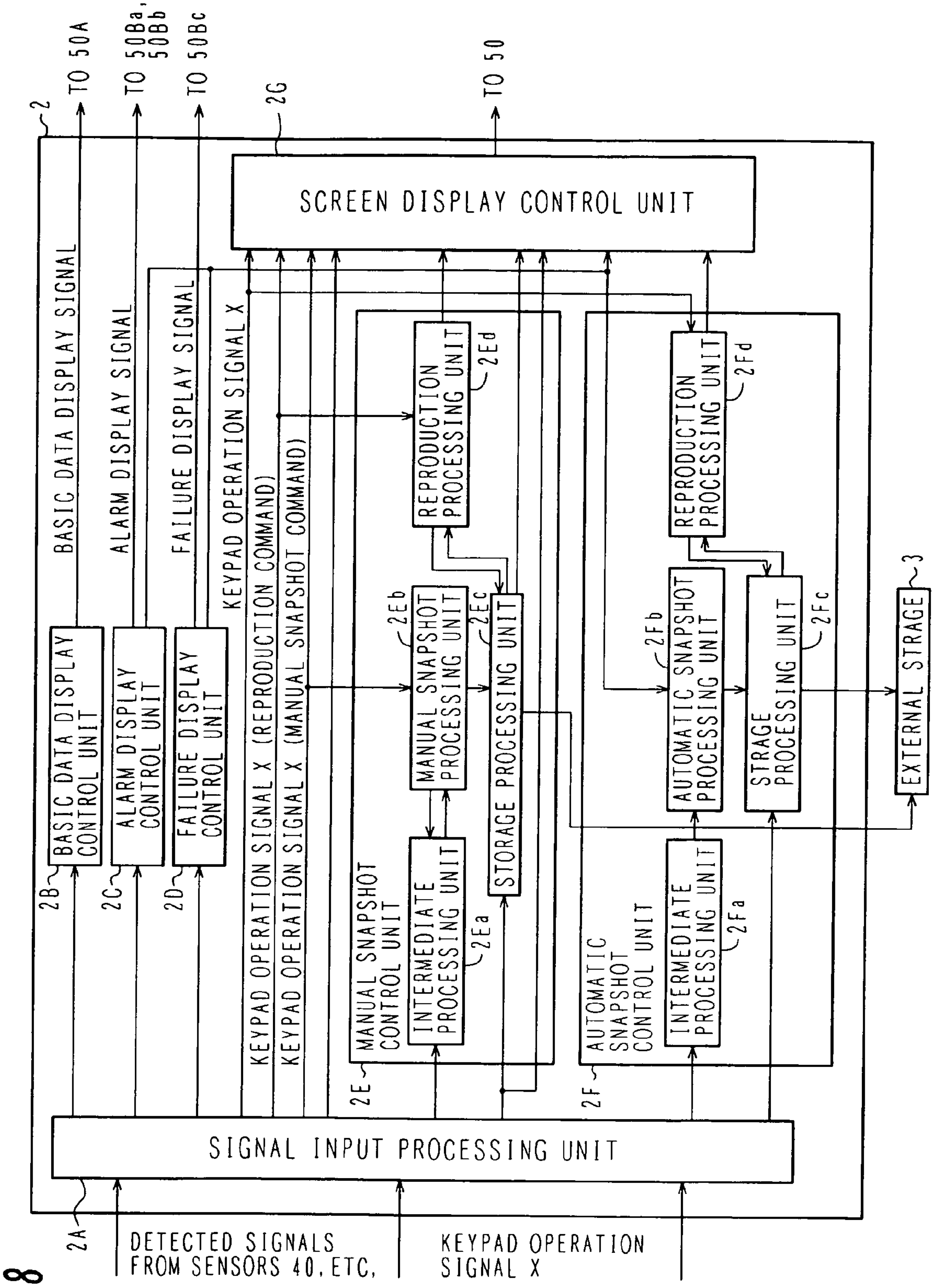
FIG. 8 is a functional block diagram showing processing functions of the controller, which constitutes one embodiment of the diagnostic information presenting apparatus for the construction machine according to the present invention.

FIG. 8 is a functional block diagram showing processing functions of the controller 2, which constitutes one embodiment of the diagnostic information presenting apparatus for the construction machine according to the present invention.

In FIG. 8, the controller 2 comprises a signal input processing unit 2A, a basic data display control unit 2B, an alarm display control unit 2C, a failure display control unit 2D, a manual snapshot control unit 2E, an automatic snapshot control unit 2F, and a screen display control unit 2G.

The manual snapshot control unit 2E comprises an intermediate processing unit 2Ea, a manual snapshot processing unit 2Eb, a storage processing unit 2Ec, and a reproduction processing unit 2Ed.

The automatic snapshot control unit 2F comprises an intermediate processing unit 2Fa, an automatic snapshot processing unit 2Fb, a storage processing unit 2Fc, and a reproduction processing unit 2Fd.

The signal input processing unit 2A takes in the detected signals from the sensors 40, etc. and the operation signal X from the keypad 51, executes predetermined reception processing, and produces outputs supplied to the control units 2B-2G.

The basic data display control unit 2B corresponds to the basic data display area 50A of the initial screen 100 on the display unit 50. Based on the detected signals of the engine revolution speeds, the detected signals of the radiator cooling water temperatures, the detected signals of the turbo-boosted pressures, the detected signal of the fuel level, the detected signal of the working oil temperature, the detected signal of the atmospheric temperature, and the detected signal of the battery voltage from the sensors 45, 46, 47*b*, 47*c*, etc., the control unit 2B outputs display signals (basic data display signals), which are used for presenting display corresponding to the respective detected status variable data (basic data), to the tachometer display areas 50Aa, 50Ad, the radiator cooling-water temperature display areas 50Ab, 50Ae, the turbo-boosted pressure display areas 50Ac, 50Af, the fuel level display area 50Ag, the working oil temperature display area 50Ah, the atmospheric temperature display area 50Ai, and the battery voltage display area 50Aj of the display unit 50.

The alarm display control unit 2C corresponds to the alarm display areas 50Ba, 50Bb of the initial screen 100 on the display unit 50, and it has the alarm on/off determining function and the alarm display signal producing function.

The alarm on/off determining function determines based on the detected signals (status variable data) from the sensors 40, etc. whether each detected signal is within the preset threshold range (i.e., the range where a signal value is not abnormal). If the detected signal is not within the preset threshold range, this is determined as indicating a state where an alarm is to be issued (i.e., an abnormal state). Then, the determination result is outputted as alarm information to the alarm display signal producing function.

Upon receiving the alarm information, the alarm display signal producing function outputs display signals for displaying corresponding alarms (i.e., alarm display signals) to the alarm display areas 50Ba, 50Bb on the display unit 50. In the alarm display areas 50Ba, 50Bb, each alarm is displayed, for example, a preset alarm mark related to the details of the alarm. Although individual alarms are not described in detail, the alarms displayed in common with the alarm display areas 50Ba, 50Bb regarding the engines 32 include, e.g., a fuel level drop alarm, a radiator cooling-water level drop alarm, a radiator cooling-water overheat alarm, and an engine exhaust temperature overheat alarm. The alarms displayed in the alarm display area 50Bb regarding the hydraulic system include, e.g., a working oil level drop alarm and a working oil overheat alarm.

Of the above-described two functions, the alarm on/off determining function may be separately provided outside the controller 2. In other words, each sensor may determine in itself whether the detected signal is normal or abnormal in comparison with the threshold, and may transmit alarm information to the alarm display signal producing function of the controller 2 if the detected signal is abnormal. As an alternative, an additional control unit (sub-controller) may be provided per sensor (or per sensor group comprising a plurality of sensors correlated with one another to some extent) to make a similar determination and transmit the alarm information.

The alarm display signals from the alarm display signal producing function are also inputted to the screen display control unit 2G for presenting various kinds of display when the screen on the display unit 50 is shifted from the initial screen 100 to any of other screens subsequent to an alarm list display screen by operation of the operator (as described later).

The failure display control unit 2D corresponds to the failure display area 50Bc of the initial screen on the display unit 50, and it has the failure presence/absence determining function and the failure display signal producing function.

The failure presence/absence determining function determines based on the detected signals (status variable data) from the sensors 40, etc. whether each detected signal indicates a failed state. As a manner of making the determination, the failed state is categorized into various types of failure modes given below:

(1) the case where the status variable data is not stabilized and is unstable;

(2) the case where a voltage level of the detected signal is too high or short-circuited to the high voltage side;

(3) the case where a voltage level of the detected signal is too low or short-circuited to the low voltage side;

(4) the case where a current level of the detected signal is too low, or a circuit is left open;

(5) the case where a current level of the detected signal is too high or short-circuited to the ground side;

(6) the case where a mechanical response is improper (the difference between a target value and a measured value is too large); and (7) the case where the frequency, the pulse width and/or the cycle is abnormal.

When any of the above conditions is met, this is determined as indicating the failed state, and the determination result is outputted as failure information to the failure display signal producing function.

Upon receiving the failure information, the failure display signal producing function outputs a display signal for displaying a corresponding failure (i.e., a failure display signal) to the failure display area 50Bc on the display unit 50. In the failure display area 50Bc, each failure is displayed, for example, as a combination of a number indicating the location where the failure has occurred and one of the above failure mode numbers. Although individual failures are not described in detail, they generally include, e.g., short-circuiting and disconnection in any of the sensors 40, etc. or a cable connected to it, a communication failure in the communication system, an abnormality in the controller 2 itself, and an abnormality in neutral position of a valve spool or sticking (seizure) thereof.

Of the above-described two functions, as in the alarm display control unit 2C, the failure presence/absence determining function may be separately provided outside the controller 2. In other words, each sensor may determine in itself with the self-monitoring function whether the detected signal is normal or abnormal, and may transmit failure information to the failure display signal producing function of the controller 2 if the detected signal is abnormal. As an alternative, an additional control unit (sub-controller) may be provided per sensor (or per sensor group comprising a plurality of sensors correlated with one another to some extent) to make a similar determination and transmit the failure information.

The failure display signals from the failure display signal producing function are also inputted to the screen display control unit 2G for presenting various kinds of display when the screen on the display unit 50 is shifted from the initial screen 100 to any of other screens subsequent to a failure list display screen by operation of the operator (as described later).

The screen display control unit 2G has the function of controlling layout of the entire screen on the display unit 50. More specifically, the screen display control unit 2G displays the entire layout of the initial screen 100 (i.e., frame and form portions except for the status variable data itself and the details of the alarm/failure display). Also, the control unit 2G outputs, to the display unit 50, the display control signals in accordance with the keypad operation signal X directly inputted from the signal input processing unit 2A, a manual snapshot start command signal, an automatic snapshot start command signal, various display signals (described later) from the manual snapshot control unit 2E and the automatic snapshot control unit 2F, the alarm display signal from the alarm display control unit 2C, as well as the failure display signal from the failure display control unit 2D. Further, the control unit 2G displays the screen 100 while shifting the initial screen to another one in a switching manner.

Figure 9:
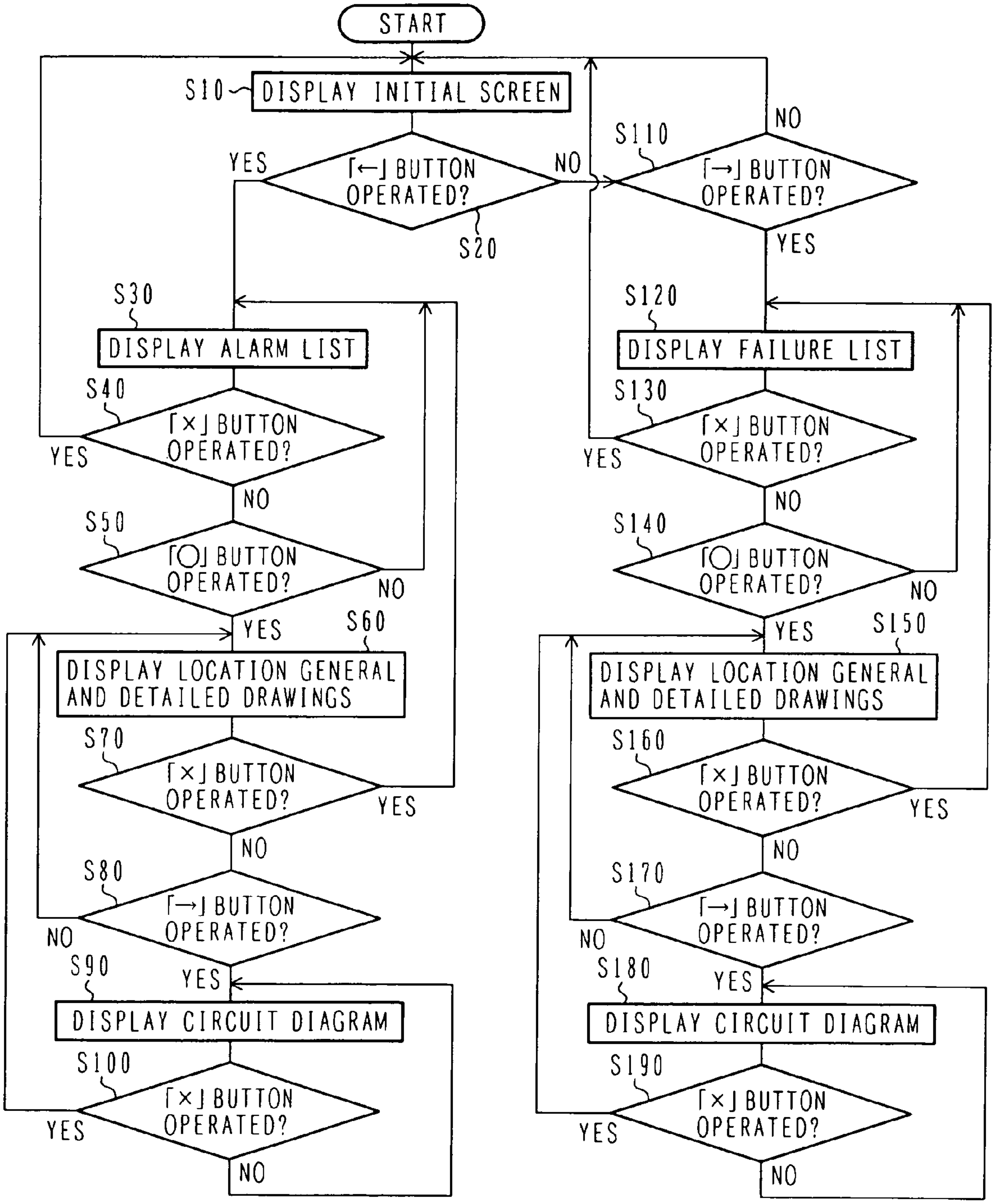
FIG. 9 is a flowchart showing control procedures of the alarm-display-side screen shift function and the failure-display-side screen shift function executed by a screen display control unit provided in the controller, which constitutes one embodiment of the diagnostic information presenting apparatus for the construction machine according to the present invention.

FIG. 9 is a flowchart showing control procedures of the alarm-display-side screen shift function and the failure-display-side screen shift function executed by the screen display control unit 2G provided in the controller 2, which constitutes one embodiment of the diagnostic information presenting apparatus for the construction machine according to the present invention.

Figure 10:
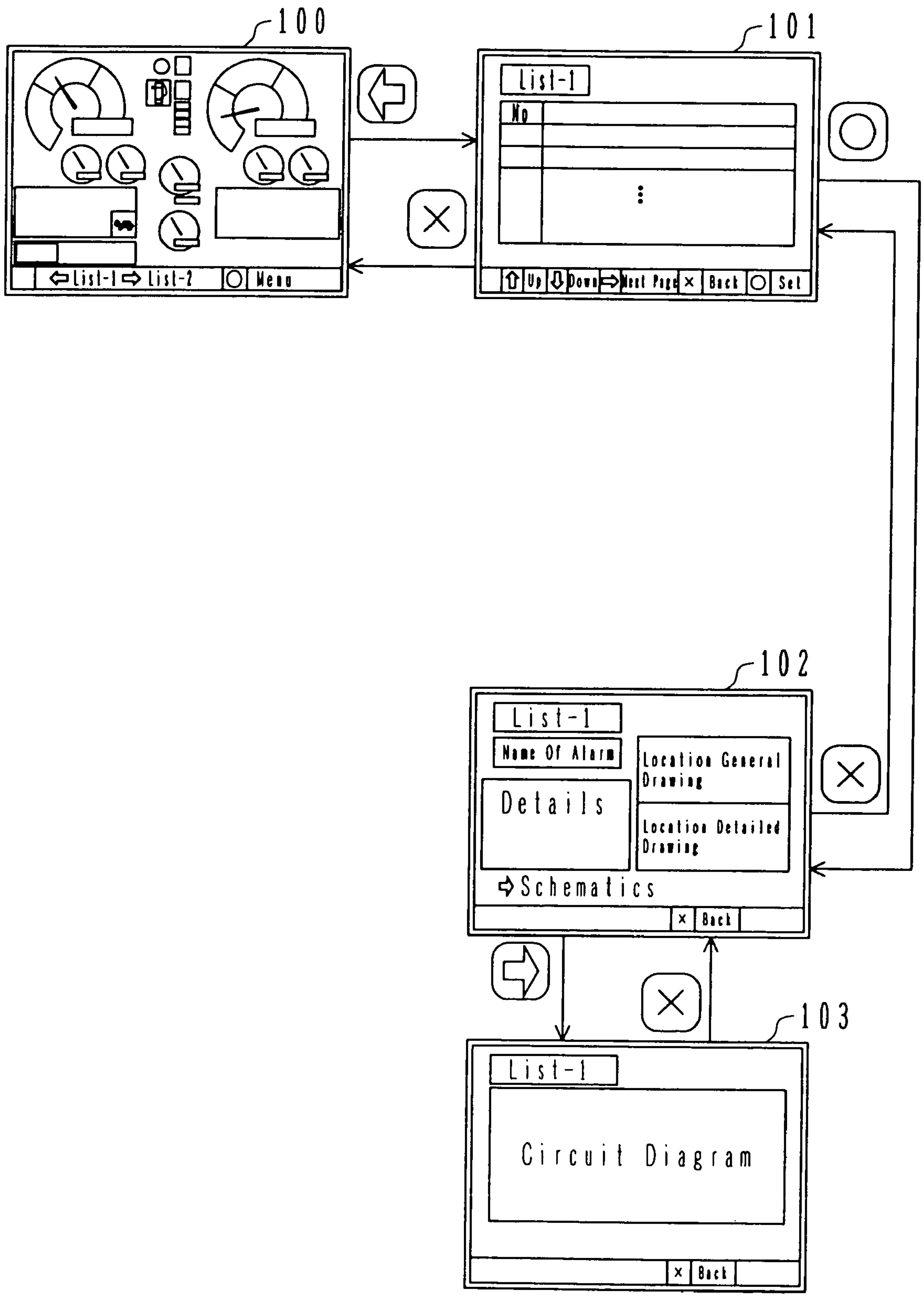
FIG. 10 is an explanatory view showing screens displayed in a switching manner by the alarm-display-side screen shift function of the screen display control unit provided in the controller, which constitutes one embodiment of the diagnostic information presenting apparatus for the construction machine according to the present invention.
Figure 11:
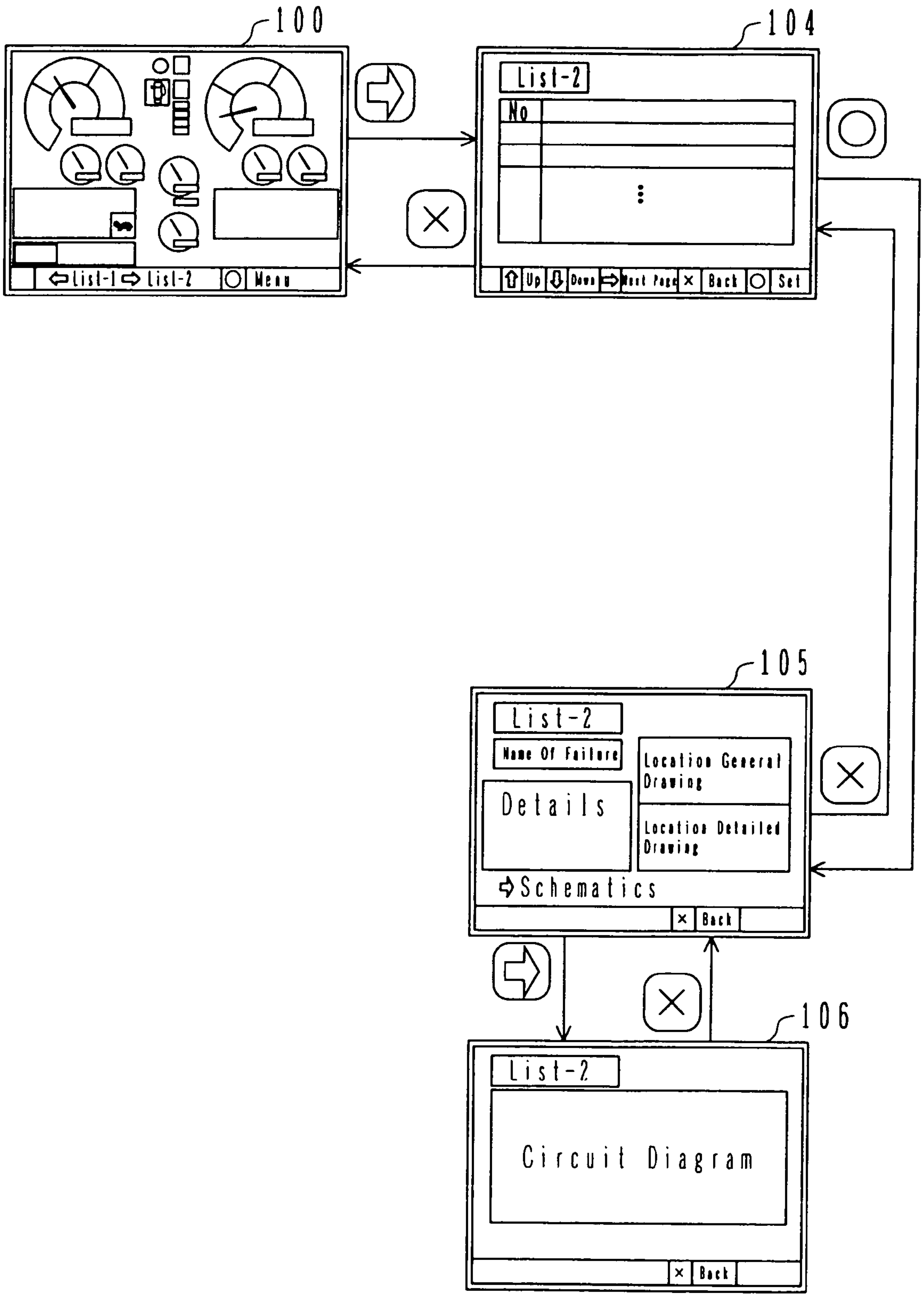
FIG. 11 is an explanatory view showing screens displayed in a switching manner by the failure-display-side screen shift function of the screen display control unit provided in the controller, which constitutes one embodiment of the diagnostic information presenting apparatus for the construction machine according to the present invention.

FIG. 10 shows screens displayed in a switching manner by the alarm-display-side screen shift function of the screen display control unit 2G provided in the controller 2, which constitutes one embodiment of the diagnostic information presenting apparatus for the construction machine according to the present invention, and FIG. 11 shows screens displayed in a switching manner by the failure-display-side screen shift function of the screen display control unit 2G provided in the controller 2, which constitutes one embodiment of the diagnostic information presenting apparatus for the construction machine according to the present invention.

In FIG. 9, the initial screen 100 is first displayed on the display unit 50 in step 10.

When the operator operates the "←" button 51*f* of the keypad 51 in the state of the initial screen 100 being displayed, the corresponding keypad operation signal X is inputted from the signal input processing unit 2A to the screen display control unit 2G (this process is similarly applied to the button operation in the following description). Thus, the determination in step 20 is satisfied, whereupon display processing comes into the alarm-side screen shift mode and proceeds to step 30 for change to an alarm list (List-1) screen 101 on which a list of alarms occurred at that time are displayed (see FIG. 10). With the operation of the "↑" button 51*d* or the "↓" button 51*e* of the keypad 51, the cursor position in the screen 101 is moved upward or downward in the screen 101. If the operator operates the "×" button 51*b* of the keypad 51 at this time, the determination in step 40 is satisfied, whereupon the display processing returns to step 10 and the initial screen 100 is displayed (see FIG. 10). If the operator operates the "○" button 51*a* of the keypad 51 in the state of one alarm being selected by the cursor, the determination in step 50 is satisfied subsequent to step 40, and the display processing proceeds to step 60.

In step 60, a detailed information screen 102 of the selected alarm is displayed (see FIG. 10). The screen 102 displays not only the name of the alarm, but also the details of the alarm, a location general drawing (which may be, for example, cited from a corresponding part of a specification drawing, a design drawing, etc. of the relevant construction machine) representing the location where the alarm is issued, and a location detailed drawing (e.g., an enlarged drawing). By looking at the screen 102, therefore, the operator can easily understand what kind of alarm is issued from which location of the relevant construction machine. If the operator operates the "×" button 51*b* of the keypad 51 at this time, the determination in step 70 is satisfied, whereupon the display processing returns to step 30 and the preceding alarm list screen 101 is displayed (see FIG. 10). If the operator operates the "→" button 51*g* of the keypad 51 at this time, the determination in step 80 is satisfied subsequent to step 70, and the display processing proceeds to step 90.

In step 90, a circuit diagram screen 103 showing the occurrence location of the selected alarm is displayed (see FIG. 10). The screen 103 displays the alarm occurrence location, which is previously displayed in the location general drawing on the detailed information screen 102, on a circuit diagram (i.e., a diagram of a hydraulic circuit or an electric circuit) to more closely indicate the position where the alarm occurrence location exists in the circuit. Therefore, the operator can easily understand the position where the alarm occurrence location exists in the circuit, and how the alarm occurrence location is related to other locations in the functional point of view. If the operator operates the "×" button 51*b* of the keypad 51 at this time, the determination in step 100 is satisfied, whereupon the display processing returns to step 60 and the preceding detailed information screen 102 is displayed (see FIG. 10).

On the other hand, if the operator operates the "→" button 51*g* of the keypad 51 in the state of the initial screen 100 being displayed, the determination in step 110 is satisfied subsequent to step 20, whereupon the display processing comes into the failure-side screen shift mode and proceeds to step 120 for change to a failure list (List-2) screen 104 on which a list of failures occurred at that time are displayed (see FIG. 11). With the operation of the "↑" button 51*d* or the "↓" button 51*e* of the keypad 51, the cursor position in the screen 104 is moved upward or downward in the screen 104. If the operator operates the "×" button 51*b* of the keypad 51 at this time, the determination in step 130 is satisfied, whereupon the display processing returns to step 10 and the initial screen 100 is displayed (see FIG. 11). If the operator operates the "○" button 51*a* of the keypad 51 in the state of one failure being selected by the cursor, the determination in step 140 is satisfied subsequent to step 130, and the display processing proceeds to step 150.

In step 150, a detailed information screen 105 of the selected failure is displayed (see FIG. 11). The screen 105 displays not only the name of the failure, but also the details of the failure, a location general drawing (which may be, for example, cited from a corresponding part of a specification drawing, a design drawing, etc. of the relevant construction machine) representing the location where the failure is caused, and a location detailed drawing (e.g., an enlarged drawing). By looking at the screen 105, therefore, the operator can easily understand what kind of failure is caused in which location of the relevant construction machine. If the operator operates the "×" button 51*b* of the keypad 51 at this time, the determination in step 160 is satisfied, whereupon the display processing returns to step 120 and the preceding failure list screen 104 is displayed (see FIG. 11). If the operator operates the "→" button 51*g* of the keypad 51 at this time, the determination in step 170 is satisfied subsequent to step 160, and the display processing proceeds to step 180.

In step 180, a circuit diagram screen 106 showing the occurrence location of the selected failure is displayed (see FIG. 11). The screen 106 displays the failure occurrence location, which is previously displayed in the location general drawing on the detailed information screen 105, on a circuit diagram (i.e., a diagram of a hydraulic circuit or an electric circuit) to more closely indicate the position where the failure occurrence location exists in the circuit. Therefore, the operator can easily understand the position where the alarm occurrence location exists in the circuit, and how the failure occurrence location is related to other locations in the functional point of view. If the operator operates the "×" button 51*b* of the keypad 51 at this time, the determination in step 190 is satisfied, whereupon the display processing returns to step 150 and the preceding detailed information screen 105 is displayed (see FIG. 11).

Returning to FIG. 8, the manual snapshot control unit 2E executes the manual snapshot function, for example, when the operator is going to know the cause of machine malfunction upon looking at the alarm and failure display areas 50B of the initial screen 100 and to manually make short-period concentrated collection of various data at the discretion of the operator. The manual snapshot control unit 2E comprises the intermediate processing unit 2Ea, the manual snapshot processing unit 2Eb, the storage processing unit 2Ec, and the reproduction processing unit 2Ed.

The intermediate processing unit 2Ea is to execute primary processing of the status variable data. More specifically, the intermediate processing unit 2Ea takes in all of the detected signals sent from the sensors 40, etc. (or from each unit of sensor group or each sub-controller as described above) at predetermined intervals via the signal input processing unit 2A. Then, it classifies and assorts the taken-in data per sensor (or per status variable), and loads and stores the data in a time-serial way.

The manual snapshot processing unit 2Eb extracts and reads, in accordance with a manual snapshot command signal (i.e., a signal for commanding a item which should execute the manual snapshot as described in detail later) inputted from the keypad 51 via the signal input processing unit 2A, those of the status variable data corresponding to the command and falling within a predetermined time from the intermediate processing unit 2Ea, thereby preparing manual snapshot data in accordance with the command. In addition, the manual snapshot processing unit 2Eb previously stores therein a map representing combinations of manual snapshot items and a plurality of corresponding status variables per item. FIG. 12 shows one example of the map.

In FIG. 12, the combinations are set, for example, such that for the manual snapshot item "engine (1) (=one-side engine) output drop", the variables "engine revolution speed", "throttle position", "intake manifold temperature", "intercooler inlet temperature", "turbo-boosted pressure", "presence/absence of engine derated state", and "on/off state of operation (whether any operation is made or not)" are collected as the corresponding status variables. The "on/off state of operation" can be obtained, for example, by taking the logical sum of the front operation signal, the swing operation signal, and the travel operation signal in the controller 2.

The manual snapshot processing unit 2Eb extracts the status variable data while referring to such a map as shown in FIG. 12.

Returning to FIG. 8, the storage processing unit 2Ec loads and stores therein the manual snapshot data prepared by the manual snapshot processing unit 2Eb in the above-described manner, and also stores the thus-loaded manual snapshot data in an external storage (e.g., a nonvolatile memory or a flash memory) 3 outside the controller 2 in accordance with an appropriate command signal (e.g., the key switch turning-OFF signal) from the operator side.

The reproduction processing unit 2Ed extracts and reads, in accordance with a reproduction command signal (i.e., a signal for commanding the manual snapshot data to be reproduced in the form of a motion image as described in detail later) inputted from the keypad 51 via the signal input processing unit 2A, those of the manual snapshot data corresponding to the command from the storage processing unit 2Ec, thereby reproducing a motion image (which may be a still image) of the manual snapshot data in accordance with the command (as described in detail later).

The automatic snapshot control unit 2F automatically executes short-period concentrated collection of various data regardless of the operator's will when the alarm or failure display is presented by the alarm display control unit 2C or the failure display control unit 2D. The automatic snapshot control unit 2F comprises the intermediate processing unit 2Fa, the automatic snapshot processing unit 2Fb, the storage processing unit 2Fc, and the reproduction processing unit 2Fd.

The intermediate processing unit 2Fa is to execute primary processing of the status variable data. More specifically, the intermediate processing unit 2Fa takes in all of the detected signals sent from the sensors 40, etc. (or from each unit of sensor group or each sub-controller as described above) at predetermined intervals via the signal input processing unit 2A. Then, it classifies and assorts the taken-in data per sensor (or per status variable), and loads and stores the data in a time-serial manner.

The automatic snapshot processing unit 2Fb includes a storage means capable of successively storing data (e.g., the so-called ring buffer that successively stores data while overwriting and updating data in units of a predetermined time). Then, it extracts and reads, from the intermediate processing unit 2Fa, the status variable data classified and loaded in the intermediate processing unit 2Fa, thereby preparing, overwriting and updating automatic snapshot primary data in a successive way. In addition, the automatic snapshot processing unit 2Fb previously stores therein a map representing combinations of alarm/failure items and a plurality of corresponding status variables per item. FIG. 13 shows one example of the map.

In FIG. 13, the combinations are set, for example, such that when a "cooling water overheat alarm" is issued, the variables "atmospheric temperature ", "cooling water temperature at upper manifold", "air temperature in front of radiator", "radiator outlet temperature", "inlet pressure of radiator cooler fan motor", "cooling water pump delivery pressure/upper manifold pressure", and "engine revolution speed" are collected as the corresponding status variables. The "cooling water pump delivery pressure/upper manifold pressure" can be obtained, for example, by detecting the respective pressures and then computing a ratio between the detected values in the controller 2.

The automatic snapshot processing unit 2Fb prepares, overwrites and updates the automatic snapshot primary data in a successive way while referring to the map. Then, when the alarm/failure display signal is inputted from the alarm display control unit 2C or the failure display control unit 2D, the automatic snapshot processing unit 2Fb extracts and reads, from the ring buffer or the like, those of the automatic snapshot primary data stored in the ring buffer or the like, which fall within a predetermined time range on the basis of the input time of the alarm/failure display signal (e.g., 1 minute before the input time and 5 minutes after the input time), thereby preparing the automatic snapshot primary data (final data).

Returning to FIG. 8, the storage processing unit 2Fc loads and stores therein the automatic snapshot (final) data prepared by the automatic snapshot processing unit 2Fb in the above-described manner, and also stores the thus-loaded automatic snapshot data in the external storage (e.g., a non-volatile memory or a flash memory) 3 outside the controller 2 in accordance with an appropriate command signal (e.g., the key switch turning-OFF signal) from the operator side.

The reproduction processing unit 2Fd extracts and reads, in accordance with a reproduction command signal (i.e., a command for selecting the alarm or the failure in reproduction of the automatic snapshot data as described in detail later) inputted from the keypad 51 via the signal input processing unit 2A, those of the automatic snapshot data corresponding to the command from the storage processing unit 2Fc, thereby reproducing a motion image (which may be a still image) of the automatic snapshot data (as described in detail later).

Figure 14:
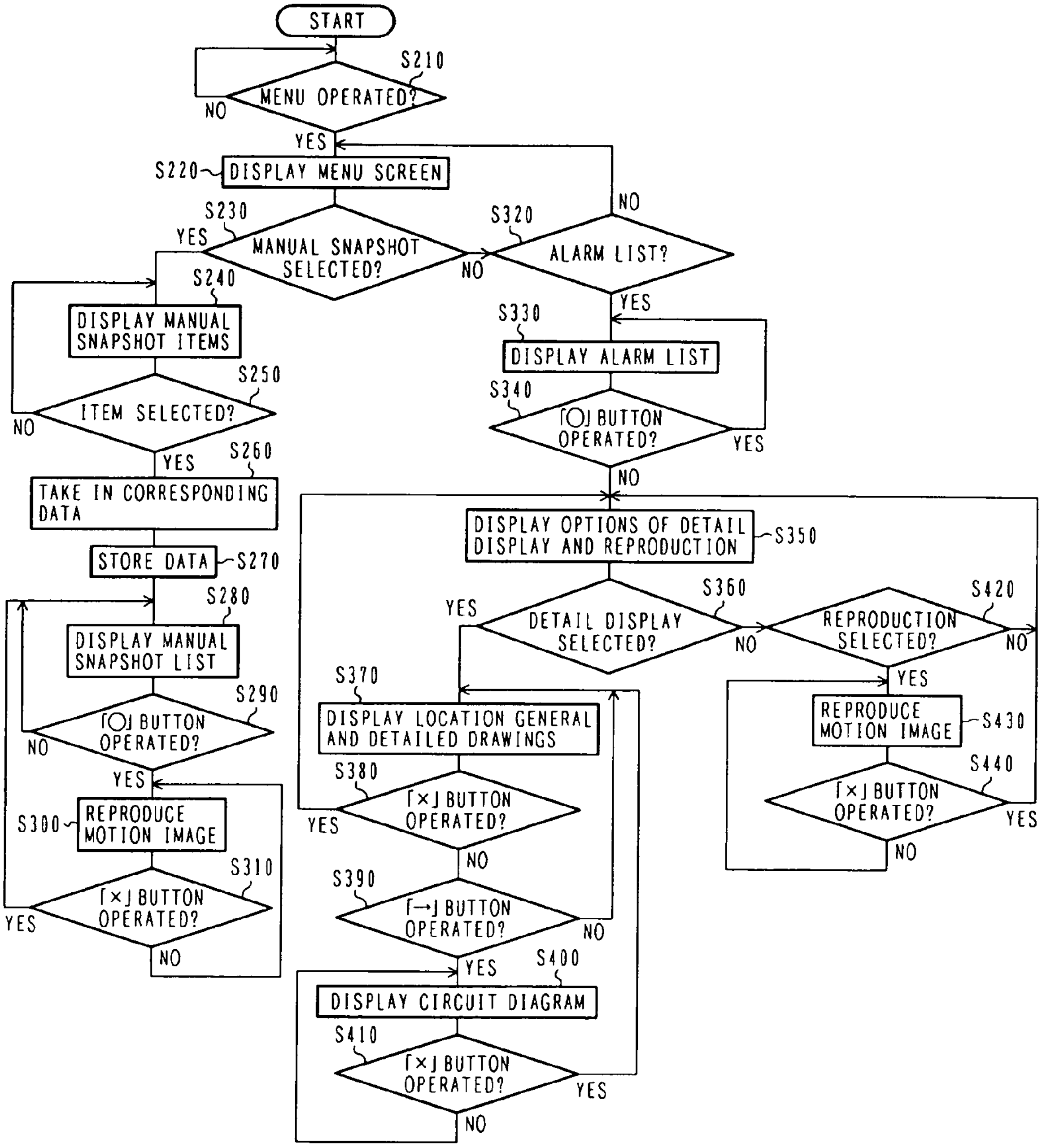
FIG. 14 is a flowchart showing control procedures of the manual snapshot processing function and the automatic snapshot processing function executed by the screen display control unit, a manual snapshot control unit, and an automatic snapshot control unit all provided in the controller, which constitutes one embodiment of the diagnostic information presenting apparatus for the construction machine according to the present invention.

FIG. 14 is a flowchart showing control procedures of the manual snapshot processing function and the automatic snapshot processing function executed by the screen display control unit 2G, the manual snapshot control unit 2E, and the automatic snapshot control unit 2F all provided in the controller 2, which constitutes one embodiment of the diagnostic information presenting apparatus for the construction machine according to the present invention.

Figure 15:
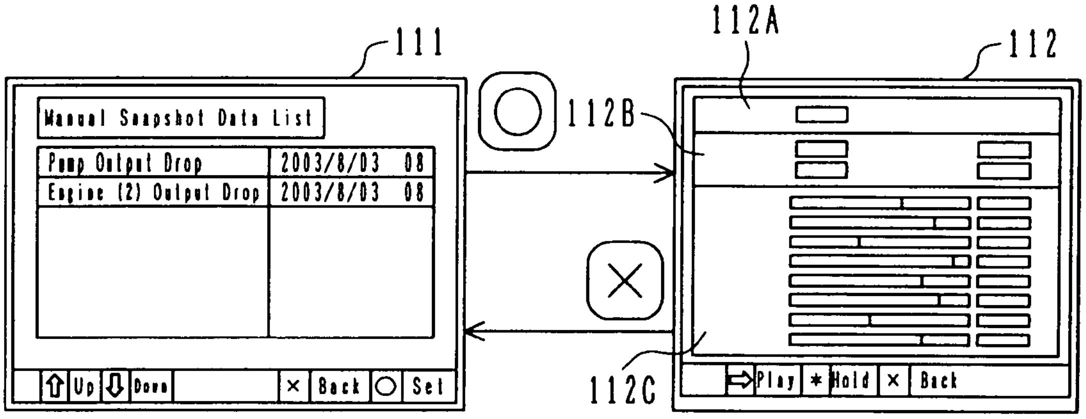
FIG. 15 shows screens displayed in a switching manner during manual snapshot processing by the screen display control unit provided in the controller, which constitutes one embodiment of the diagnostic information presenting apparatus for the construction machine according to the present invention.
Figure 16:
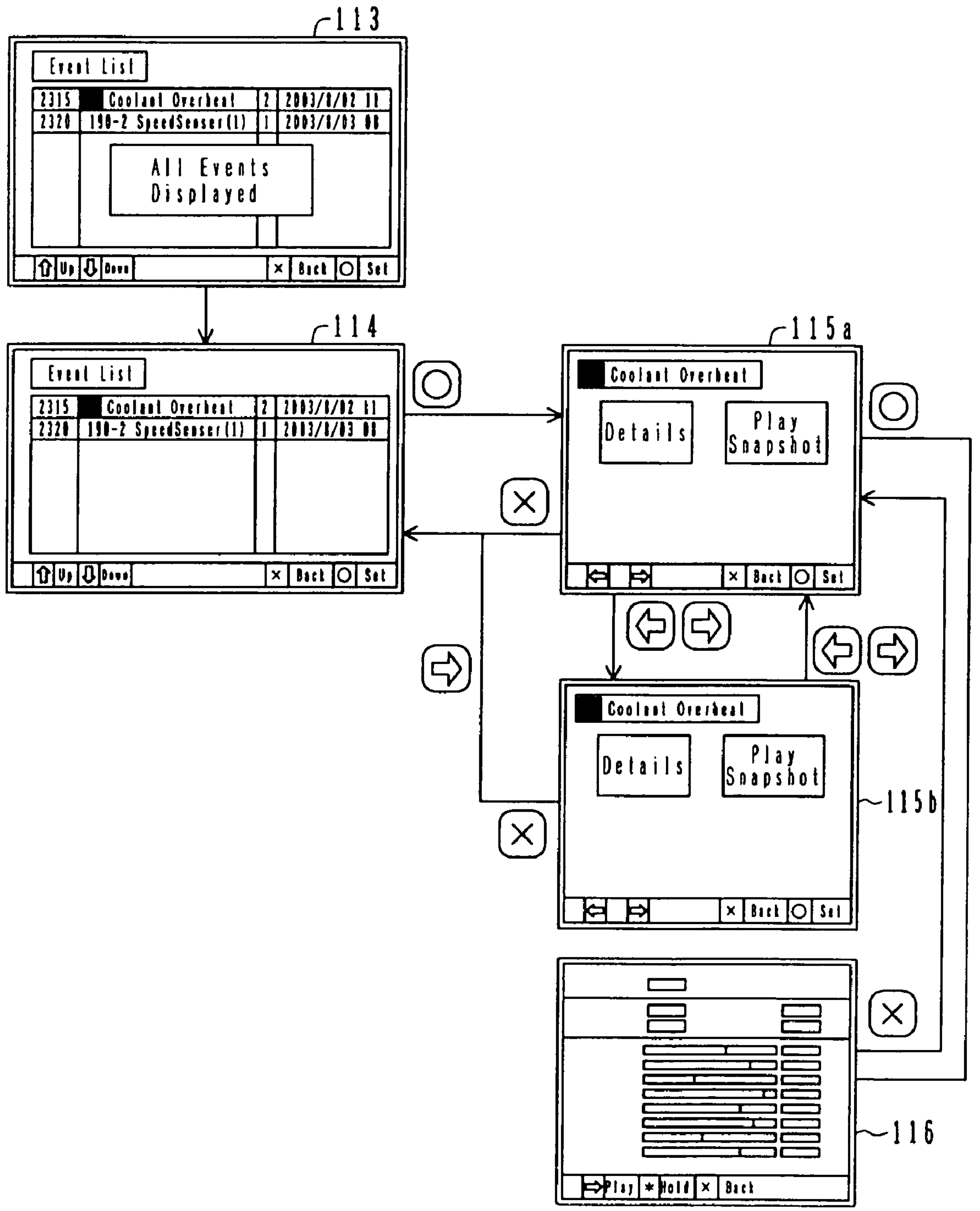
FIG. 16 shows screens displayed in a switching manner during automatic snapshot processing by the screen display control unit provided in the controller, which constitutes one embodiment of the diagnostic information presenting apparatus for the construction machine according to the present invention.

FIGS. 15 and 16 show screens displayed in a switching manner during the manual snapshot processing and the automatic snapshot processing, respectively, by the screen display control unit 2G provided in the controller 2, which constitutes one embodiment of the diagnostic information presenting apparatus for the construction machine according to the present invention.

In FIG. 14, when the operator operates the "○" button 51*a* of the keypad 51 in the state of the initial screen 100 being displayed on the display unit 50, the corresponding keypad operation signal X is inputted from the signal input processing unit 2A to the screen display control unit 2G (this process is similarly applied to the button operation in the following description). Thus, because the determination in step 210 is satisfied, the display processing proceeds to step 220 in which a (service) menu screen 110 is displayed.

Figure 17:
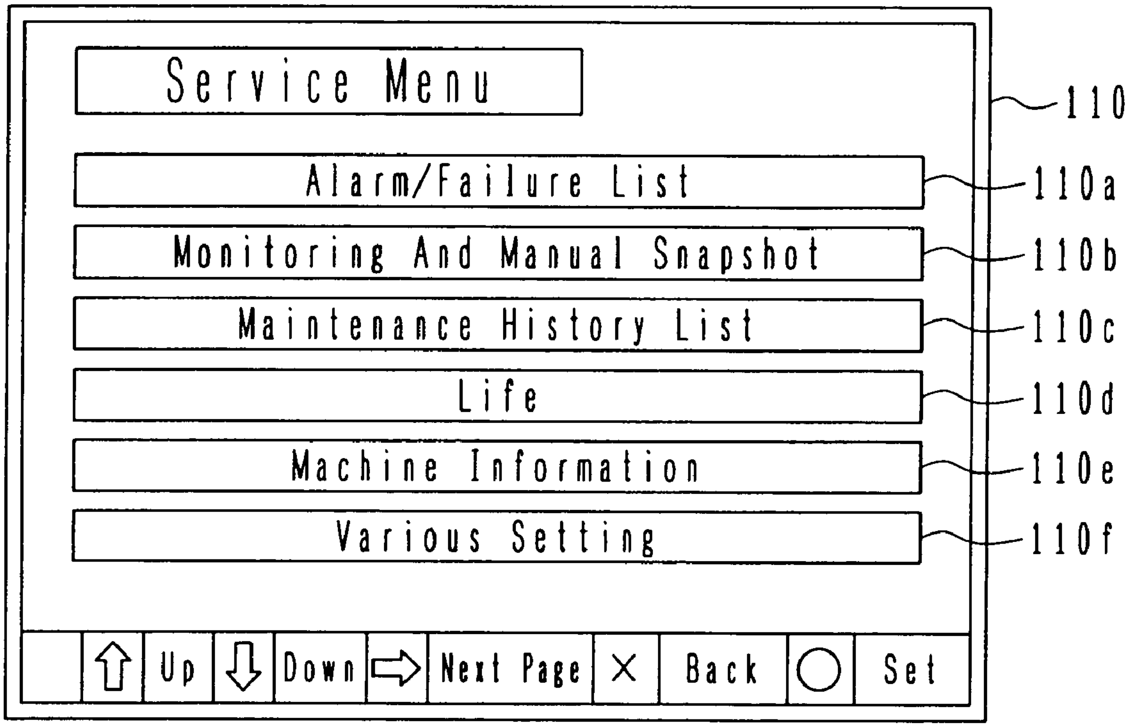
FIG. 17 shows a menu screen displayed with operation of the keypad in the state where the initial screen is displayed on the display unit.

FIG. 17 shows the menu screen 110. As shown in FIG. 17, the menu screen 110 contains an "alarm/failure list" button 110*a* for displaying a list of current and past alarms/failures (after displaying the list, this button can further reproduce the automatic snapshot data), and a "monitoring and manual snapshot" button 110*b* for executing the manual snapshot.

If the operator operates the "↑" or "↓" button 51*d*, 51*e* of the keypad 51 to select the "monitoring and manual snapshot" button 110*b* and then operates the "○" button 51*a* of the keypad 51 in the state of the menu screen 110 being displayed, the determination in step 230 is satisfied, whereupon the display processing comes into the manual-snapshot-side screen shift mode and proceeds to step 240 for change to a snapshot item display screen (not shown).

On the snapshot item display screen, though not shown, the manual snapshot items described above with reference to FIG. 12 (i.e., "engine (1) output drop", "engine (2) output drop", "drop of working oil heat balance", etc.) are displayed in the form of buttons. If the operator operates the "↑" button 51*d* or the "←" button 51*e* of the keypad 51 to select one item and then operates the "○" button 51*a* of the keypad 51 in the state of the snapshot item display screen being displayed, the determination in step 250 is satisfied and the display processing proceeds to step 260.

In step 260, the status variable data corresponding to the selected item is taken in. More specifically, as described above, the manual snapshot processing unit 2Eb extracts and reads, from the intermediate processing unit 2Ea, those of the status variable data corresponding to the selected item (e.g., data of "engine revolution speed", "throttle position", "intake manifold temperature", "intercooler inlet temperature", "turbo-boosted pressure", "presence/absence of engine derated state", and "on/off state of operation" when the item "engine (1) output drop" is selected), which fall within a predetermined time range (or a certain range before and after the manual snapshot commanded time, the certain range being preset or instructed by the operator at that time), thereby preparing the manual snapshot data. Thereafter, the display processing proceeds to step 270 in which the storage processing unit 2Ec loads and stores the manual snapshot data prepared by the manual snapshot processing unit 2Eb as described above. During a period of steps 260 and 270, a corresponding appropriate screen is displayed by the screen display control unit 2G.

After the manual snapshot data has been thus completely loaded and stored in step 270, the display processing proceeds to step 280 in which the screen display control unit 2G displays a manual snapshot data list screen 111 which contains not only the manual snapshot data just now prepared stored, but also the manual snapshot data loaded and stored before that time (see FIG. 15). The screen 111 schematically displays the name of the manual snapshot data and the date when the manual snapshot was performed. Such display enables the operator to easily recognize that attention was focused on what part or point in the relevant machine when the manual snapshot was performed by himself (or the operator in the preceding working shift, etc.) in the past. With the operation of the "↑" button 51*d* or the "←" button 51*e* of the keypad 51, the cursor position in the screen 111 is moved upward or downward. Then, if the operator operates the "○" button 51*a* of the keypad 51 in the state of one item of the manual snapshot data being selected, the determination in step 290 is satisfied and the display processing proceeds to step 300.

In step 300, the reproduction processing unit 2Ed displays a motion image reproduction screen 112 on which the selected manual snapshot data is reproduced in the form of a motion image (see FIG. 15). On the screen 112, numeral 112A represents an area for displaying the name of the manual snapshot item (such as "engine (1) output drop"), 112B represents an area for displaying changes of those of the corresponding status variable data within a certain period, which are indicated in ON/OFF fashion, and 112C represents an area for displaying changes of those of the corresponding status variable data within the period, which are indicated as physical quantities. In the area 112C, each of the physical quantities is displayed in the form of a horizontally extending bar graph as shown, and changes of the physical quantity within the period are displayed through reproduction of a motion image in a visually clearly discernable way with continuous extension and contraction of the bar graph. On the right side of the bar graph, the name of the corresponding status variable (or sensor) is displayed. If the operator operates the "×" button 51*b* of the keypad 51 at this time, the determination in step 310 is satisfied, whereupon the display processing returns to step 280 and the preceding manual snapshot data list screen 111 is displayed (see FIG. 15).

On the other hand, if the operator operates the "alarm/failure list" button 110*a* in the state of the menu screen 110 being displayed, the determination in step 320 is satisfied, whereupon the display processing comes into the automatic-snapshot-side screen shift mode and proceeds to step 330 in which the screen display control unit 2G changes the screen, in accordance with the signals from the alarm display control unit 2C and the failure display control unit 2D, to an alarm/failure (=event) list screen 113 for displaying a list of the contents of alarms/failures occurred at the present and in the past (see FIG. 16). The screen 113 schematically displays the name of each alarm or failure and the date when the alarm or the failure occurred. Such display enables the operator to easily recognize what kinds of troubles have occurred in the relevant machine operated by himself (or the operator in the preceding working shift, etc.) up to now. With the operation of the "↑" button 51*d* or the "↓" button 51*e* of the keypad 51, the cursor position in the screen 113 is moved upward or downward. Then, if the operator operates the "○" button 51*a* of the keypad 51 in the state of one item of the alarm or failure data being selected (see FIG. 16), the determination in step 340 is satisfied and the display processing proceeds to step 350.

In step 350, the screen display control unit 2G changes the screen to a detail display/reproduction selection screen 115 for prompting the operator to select a shift to a screen for displaying details of the selected alarm or failure or to a screen for reproducing the automatic snapshot data that has been already collected and stored at that time. With the operation of the "→" button 51*g* or the "leftward" button 51*f* of the keypad 51, a "detail" button or a "snapshot reproduction" button can be selected depending on the cursor position on the screen 115. If the operator operates the "○" button 51*a* of the keypad 51 in the state of the "detail" button being selected by the operator (i.e., on a screen 115*b* in FIG. 16), the determination in step 360 is satisfied and the display processing proceeds to step 370.

In step 370, a detailed information screen (not shown) of the selected alarm or failure is displayed. This screen is similar to the above-described screen 102, and displays not only the name of the alarm or the failure, but also the details of the alarm or the failure, a location general drawing representing the location where the alarm or the failure is caused, and a location detailed drawing (e.g., an enlarged drawing). If the operator operates the "×" button 51*b* of the keypad 51 at this time, the determination in step 380 is satisfied, whereupon the display processing returns to step 350 and the preceding screen 115 is displayed (see FIG. 16). If the operator operates the "→" button 51*g* of the keypad 51 at this time, the determination in step 390 is satisfied subsequent to step 380, and the display processing proceeds to step 400.

In step 400, a circuit diagram screen showing the occurrence location of the selected alarm or failure is displayed (though not shown). This screen is similar to the above-described screen 103 and displays the alarm or failure occurrence location, which is previously displayed in the location general drawing on the detailed information screen, on a circuit diagram (i.e., a diagram of a hydraulic circuit or an electric circuit) to more closely indicate the position where the alarm occurrence location exists in the circuit. If the operator operates the "×" button 51*b* of the keypad 51 at this time, the determination in step 410 is satisfied, whereupon the display processing returns to step 370 and the preceding screen 115 is displayed.

On the other hand, if the operator operates in step 350 the "○" button 51*a* of the keypad 51 in the state of the "snapshot reproduction" button being selected by the operator (i.e., on a screen 115*a* in FIG. 16), the determination in step 420 is satisfied subsequent to step 360, and the display processing proceeds to step 430.

In step 430, the reproduction processing unit 2Fd displays a motion image reproduction screen 116 on which the snapshot data having been already produced by the automatic snapshot processing unit 2Fb and stored in the storage processing unit 2Fc regarding the selected alarm or failure is reproduced in the form of a motion image (see FIG. 16). The screen 116 is similar to the manual snapshot motion image reproduction screen 112 described above, and has an area for displaying the name of the automatic snapshot item (such as "cooling water overheat alarm"), an area for displaying changes of those status variables within a certain period, which are indicated in ON/OFF fashion, and an area for displaying changes of those status variables within the period, which are indicated as physical quantities, in the form of bar graphs. If the operator operates the "×" button 51*b* of the keypad 51 at this time, the determination in step 440 is satisfied, whereupon the display processing returns to step 350 and the preceding screen 115 is displayed (see FIG. 16). certain period, which are indicated in ON/OFF fashion, and an area for displaying changes of those status variables within the period, which are indicated as physical quantities, in the form of bar graphs. If the operator operates the "×" button 51*b* of the keypad 51 at this time, the determination in step 440 is satisfied, whereupon the display processing returns to step 350 and the preceding screen 115 is displayed (see FIG. 16).

Returning to FIG. 17, the menu screen 110 includes other buttons 110*c*, 110*d*, 110*e* and 110*f* in addition to the above-described buttons 110*a*, 110*b*.

When the “maintenance history list” button 110*c* is operated, the screen display control unit 2G shifts, though not described in detail, the screen to a maintenance history list display screen (not shown). During an entire service period of the relevant machine, whenever a worker or an operator performs maintenance work such as supply of grease to needed parts, an oil change, a filter change, greasing, an element change, a cooling water change, and a working oil change, maintenance history data is inputted by the worker or the operator and is stored as maintenance history data separately in the storage means. The stored maintenance history is read and displayed on the maintenance history list display screen. The maintenance history list displays, for example, the above-mentioned maintenance items, a time interval preset (as a time until the change) for each item, and the lapse of time from the actual last change to now.

When the “life” button 110*d* is operated, the screen display control unit 2G displays, though not described in detail, a life data display screen for displaying a cumulative operation time of each part of the machine from the start of total operation thereof, which is collected by the function (not shown) of the controller 2 for collecting the operation time of each machine part.

When the “machine information” button 110*e* is operated, the screen display control unit 2G displays, though not described in detail, a machine information (property) data display screen for displaying specific information of the machine itself, such as the machine model number, the machine body number, the controller name, the software name, and the version.

When the “various settings” button 110*f* is operated, the screen display control unit 2G displays, though not described in detail, a various-settings screen for making the maintenance period setting, the alarm ON/OFF setting, and other settings.

The following advantageous effects are obtained with this embodiment constructed as described above.

(1) Operator’s Burden Reducing Effect with Simplification in Display of Initial Screen With this embodiment, the sensors 40, etc. detect the status variables regarding the operating status or the ambient environments, and the basic data display control unit 2B of the controller 2 outputs basic data display signals, which are necessary for the initial screen 100, to the display unit 50 in accordance with the detected signals, thereby displaying the basic data in the basic data display area 50A. On the other hand, in accordance with alarm information regarding the status variables detected the sensors 40, etc., the alarm display control unit 2C outputs alarm display signals to the display unit 50 so that the alarm information is displayed in the alarm display areas 50Ba, 50Bb. Also, in accordance with failure information from the sensors 40, etc., the failure display control unit 2D outputs a failure display signal to the display unit 50 so that the failure information is displayed in the failure display area 50Bc.

Thus, during the machine operation by the operator, unless the screen shift operation is not particularly inputted, only the least necessary basic data is displayed in the basic data display area 50A of the initial screen 100 on the display unit 50, and the alarm/failure information is displayed in the alarm/failure display area 50B, whereas the other data is not displayed. It is therefore possible to effectively present abnormal information of the construction machine in the least necessary way while providing the display in a manner to avoid the operator from feeling psychological burdens and nuisances beyond an allowable level.

(2) Effect with Manual Snapshot

With this embodiment, when, upon looking at the alarm display or the failure display presented in the alarm/failure display area 50B of the initial screen 100, the operator operates the keypad 51 to display the snapshot item display screen and selects one of the displayed manual snapshot item, those of the status variable data related to the selected item, which are within the predetermined time, are acquired by the manual snapshot control unit 2E and are temporarily stored therein. Thereafter, when the operator operates the keypad 51 in the state of the manual snapshot data list screen 111 being displayed, the reproduction processing unit 2Ed outputs a reproduction display signal to display the motion image reproduction screen 112.

Thus, from the alarm/failure display presented in the least necessary way on the initial screen 100, the operator is able to confirm details of the alarm/failure, as required, for assistance to failure diagnosis. Particularly, since only the related status variables within the predetermined time are automatically acquired, reproduced and displayed upon the operator just selecting the snapshot item, the occurrence location of an abnormality in the construction machine and details of the abnormality can be accurately presented without wasteful information. As a result, it is possible to minimize the downtime of the construction machine in the event of an abnormality, and to increase productivity.

(3) Effect with Automatic Snapshot

With this embodiment, when the alarm display or the failure display is presented in the alarm/failure display area 50B of the initial screen 100, those of the status variable data related to the displayed alarm or failure, which are within the predetermined time, are automatically acquired by the automatic snapshot control unit 2F of the controller 2 and are stored therein. Thereafter, when the operator operates the keypad 51 in the state of the screen 113 being displayed, the reproduction processing unit 2Fd outputs a reproduction display signal to display the motion image reproduction screen 116.

Thus, from the alarm/failure display presented in the least necessary way on the initial screen 100, the operator is able to confirm details of the alarm/failure, as required, for assistance to failure diagnosis. Particularly, since the status variables regarding the alarm/failure within the predetermined time are automatically acquired and they can be reproduced and displayed thereafter without requiring the operator to perform any special operation during work with ordinary operations, the occurrence location of an abnormality in the construction machine and details of the abnormality can be accurately presented without wasteful information. As a result, it is possible to minimize the downtime of the construction machine in the event of an abnormality, and to increase productivity.

(4) Effect with Display of Maintenance History

A construction machine used for excavation of earth and rocks in a large work site or the like, such as a large-sized hydraulic excavator, is continuously operated and only operators take turns in operating the machine per predetermined time. In the event of any alarm or failure, for example, the operator having relieved the predecessor often wants to know what kinds of maintenance have been made during work performed by the preceding operator.

With this embodiment, to meet such a demand, when the operator operates the "maintenance history list" button 110*c* on the menu screen 110 upon looking the alarm display or the failure display, for example, a maintenance history list is displayed on the maintenance history list display screen. Thus, from the alarm/failure display presented in the least necessary way on the initial screen 100, the operator is able to confirm maintenance situations, as required, for assistance to failure diagnosis.

While the above description is made in connection with hydraulic excavator as one example of the construction machine, the present invention is not limited to such an application. The present invention is applicable to other type of construction machines, such as a crawler crane and a wheel loader, and similar effects to those described above can also be obtained in those cases.

INDUSTRIAL APPLICABILITY

According to an aspect of the present invention, during the machine operation by the operator, only the least necessary basic data is displayed on display means, and alarm/failure display is presented, whereas the other data is not displayed on the usual screen. It is therefore possible to effectively present abnormal information of the construction machine in the least necessary way while providing the display in a manner to avoid the operator from feeling psychological burdens and nuisances beyond an allowable level.

According to an aspect of the present invention, from the alarm/failure display presented in the least necessary way on the usual screen, the operator is able to confirm details of the alarm/failure, as required, for assistance to failure diagnosis. Therefore, operator's physical and psychological burdens can be prevented from increasing with the display information presented in an intricate and frequent way beyond a necessary level as experienced in the related art, and fatigue of the operator can be greatly reduced. Further, when the operator confirms the details of the alarm/failure, just by selecting one of the snapshot items, only the status variables regarding the selected item and being within the predetermined time are automatically acquired, reproduced and displayed. Hence, the occurrence location of an abnormality in the construction machine and details of the abnormality can be accurately presented without wasteful information. As a result, it is possible to minimize the downtime of the construction machine in the event of an abnormality, and to increase productivity.

According to another aspect of the present invention, from the alarm/failure display presented in the least necessary way on the usual screen, the operator is able to confirm details of the alarm/failure, as required, for assistance to failure diagnosis. Therefore, operator's physical and psychological burdens can be prevented from increasing with the display information presented in an intricate and frequent manner beyond a necessary level as experienced in the related art, and fatigue of the operator can be greatly reduced. Further, when confirming the details of the alarm/failure, since the status variables regarding the alarm/failure and being within the predetermined time are automatically acquired, reproduced and displayed without requiring the operator to perform any special operation, the occurrence location of an abnormality in the construction machine and details of the abnormality can be accurately presented without wasteful information. As a result, it is possible to minimize the downtime of the construction machine in the event of an abnormality, and to increase productivity.

According to the aspect of the present invention, when the operator performs an appropriate selection operation, for example, upon looking at the alarm display or the failure display, a maintenance history list is displayed on the display means in accordance with a maintenance history display signal outputted from control means in response to the selection command. Thus, from the alarm/failure display presented in the least necessary way on the usual screen, the operator is able to confirm maintenance situations, as required, for assistance to failure diagnosis.

The invention claimed is:

1. A diagnostic information presenting apparatus for a construction machine, comprising:

detection means for detecting status variables regarding operating status or ambient environments of a construction machine;

a display unit for displaying a usual screen having a basic data display area for displaying basic data necessary in operation, an alarm display area for displaying a preset alarm mark related to details of alarm, and a failure display area for displaying a preset failure code related to details of failure;

a basic data display control unit for outputting display signals of the basic data based on the status variables detected by said detection means so as to display the basic data on said basic data display area of said usual screen;

an alarm display control unit for determining, based on the status variables detected by said detection means, whether the status variables indicate an alarmed state and outputting alarm display signals when the status variables are determined as indicating the alarmed state, so as to display the alarm mark on said alarm display area on condition that said usual screen is not shifted;

a failure display control unit for determining, based on the status variables detected by said detection means, whether the status variables indicate a failed state of said detection means and outputting failure display signals when the status variables are determined as indicating the failed state, so as to display the failure code on said failure display area on condition that said usual screen is not shifted; and a screen display control unit for shifting said usual screen displayed in said display unit in response to manipulation by an operator to an alarm list screen for displaying a list of current and past alarms, or to a failure list screen for displaying a list or current and past failures.

2. The diagnostic information presenting apparatus for the construction machine according to claim 1, wherein said screen display control unit shift said alarm list screen in response to manipulation by the operator who selects one of the alarm list items on said alarm list screen displayed in said display unit to a detailed information screen for displaying a location general drawing representing the location where the selected alarm is issued, or to a circuit diagram screen for displaying the occurrence location of the selected alarm on a circuit diagram.

3. The diagnostic information presenting apparatus for the construction machine according to claim 1, wherein said screen display control unit shifts said failure list screen in response to manipulation by the operator who selects one of the failure list items on said failure list screen displayed in said display unit to a detailed information screen for displaying a location general drawing representing the location where the selected failure is issued, or to a circuit diagram screen for displaying the occurrence location of the selected failure on a circuit diagram.

4. The diagnostic information presenting apparatus for the construction machine according to claim 1, wherein the base data displayed on said base data display area of said usual screen is selected from engine revolution speed, radiator cooling water temperature, turbo-boosted pressure, fuel level, working oil temperature, atmospheric temperature, and battery voltage.

* * * * *